(12) United States Patent
Wan et al.

(10) Patent No.: US 9,258,200 B2
(45) Date of Patent: Feb. 9, 2016

(54) METHOD AND APPARATUS FOR ACQUIRING QUALITY OF EXPERIENCE AND METHOD AND APPARATUS FOR ENSURING QUALITY OF EXPERIENCE

(71) Applicant: Huawei Technologies Co., Ltd., Shenzhen (CN)

(72) Inventors: Qun Wan, Hangzhou (CN); Jianming Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 13/838,222

(22) Filed: Mar. 15, 2013

(65) Prior Publication Data
US 2013/0272150 A1 Oct. 17, 2013

(30) Foreign Application Priority Data
Mar. 15, 2012 (CN) .......................... 2012 1 0068920

(51) Int. Cl.
*H04B 17/00* (2015.01)
*H04L 12/26* (2006.01)
*H04L 12/24* (2006.01)

(52) U.S. Cl.
CPC .............. *H04L 43/08* (2013.01); *H04L 12/24* (2013.01); *H04L 41/5009* (2013.01); *H04L 41/5038* (2013.01)

(58) Field of Classification Search
CPC ..... H04L 12/26; H04L 12/56; H04L 12/2697; H04L 29/0651; H04L 29/06469; H04L 29/06523; H04L 43/50; H04L 41/5003; H04L 41/0677; H04W 24/08; H04W 92/10; H04W 36/0088

USPC ............ 370/252, 230, 235, 328–332, 395.21; 709/213, 223–226, 231, 233, 235; 455/422.1, 423, 452.2
See application file for complete search history.

(56) References Cited

U.S. PATENT DOCUMENTS 6,690,649 B1 * 2/2004 Shimada ............. H04L 41/5003
370/238
7,403,487 B1 * 7/2008 Foladare ............. H04L 41/0896
370/232

(Continued)

FOREIGN PATENT DOCUMENTS

CN 101188847 A 5/2008
CN 101448175 A 6/2009

(Continued)

OTHER PUBLICATIONS

Lars Rosen, X-layer reverse resource reservation, May 2008, Hewlett-Packard Company, pp. 1-2.*

*Primary Examiner* — Charles C Jiang
*Assistant Examiner* — Mohamed Kamara
(74) *Attorney, Agent, or Firm* — Brinks Gilson & Lione

(57) ABSTRACT

A method for acquiring quality of experience QOE of a telecommunication service is provided. The method includes: acquiring multiple groups of original KQI vectors and a QOE value corresponding to each group of original KQI vectors in the multiple groups of original KQI vectors; analyzing a relationship between the multiple groups of original KQI vectors and QOE values corresponding to the multiple groups of original KQI vectors to establish a function relationship between KQI vectors and QOE values corresponding to the KQI vectors; acquiring a current KQI vector, and applying the function relationship between the KQI vectors and the QOE values corresponding to the KQI vectors to obtain a current QOE value corresponding to the current KQI vector.

40 Claims, 20 Drawing Sheets

(56) References Cited

U.S. PATENT DOCUMENTS

| | | | |
|---|---|---|---|
| 8,531,982 B1* | 9/2013 | Lee | H04W 24/08 370/252 |
| 8,923,156 B1* | 12/2014 | Lee | H04W 24/08 370/252 |
| 2006/0159017 A1* | 7/2006 | Mun | H04L 12/2602 370/230 |
| 2010/0054134 A1 | 3/2010 | Briand et al. | |
| 2011/0007648 A1 | 1/2011 | Liu et al. | |
| 2011/0090922 A1 | 4/2011 | Wang et al. | |
| 2011/0135017 A1 | 6/2011 | Tu | |

FOREIGN PATENT DOCUMENTS

| | | | |
|---|---|---|---|
| CN | 101577631 A | | 11/2009 |
| CN | 101621351 A | | 1/2010 |
| CN | 101667939 A | | 3/2010 |
| CN | 101783754 A | | 7/2010 |
| CN | 101820665 A | | 9/2010 |
| CN | 102098686 A | | 6/2011 |
| CN | 201110029683 | * | 6/2011 |

* cited by examiner

METHOD AND APPARATUS FOR ACQUIRING QUALITY OF EXPERIENCE AND METHOD AND APPARATUS FOR ENSURING QUALITY OF EXPERIENCE

CROSS-REFERENCE TO RELATED APPLICATION

This application claims priority to Chinese Patent Application No. 201210068920.8, filed on Mar. 15, 2012, which is hereby incorporated by reference in its entirety.

FIELD OF THE INVENTION

The present invention relates to the field of communications technologies, and in particular, to a method and an apparatus for acquiring quality of experience (Quality of Experience, QOE) of a telecommunication service, and a method and an apparatus for ensuring QOE of the telecommunication service.

BACKGROUND OF THE INVENTION

Quality of experience (Quality of Experience, QOE) indicates subjective experience of a user on the satisfaction of a certain product or service. It usually serves as one of the key indicators for evaluating the quality of a communication service, such as telecommunication, and is used to assess the service quality of various telecommunication services (such as conversation, short message, and Internet access through Wi-Fi) from the view of a user. Currently, a method for evaluating quality of experience widely used in the industry is to assess the relationship between quality classes by establishing indicators of quality of service (Quality of Service, QoS) and through dial test, where the indicators of quality of service indicate key performance indexes (Key Performance Indexes, KPIs) of network elements, the key performance indexes include time delay jitter and packet loss, and the quality of experience classes (MoS scores) are acquired by means of subjective assessment through dial test. By inputting the acquired key performance indexes and the quality of experience classes into a pre-defined neural network model for training, the mapping between the key performance indexes and the quality of experience classes can be acquired. When it is required to evaluate the quality of experience of a certain service, the corresponding quality of experience can be predicted by acquiring a certain or multiple key performance indexes of the service. However, the scores for the quality of experience classes reflect the assessment of dial test personnel, but not assessment of local common users. The key performance indexes cannot directly evaluate the objective quality of service, and accordingly service parameters cannot be accurately adjusted according to the quality of experience classes to ensure QOE of a telecommunication service.

SUMMARY OF THE INVENTION

As such, embodiments of the present invention provide a method and an apparatus that are capable of objectively acquiring quality of experience of a telecommunication service and a method and an apparatus for ensuring quality of experience of a telecommunication service.

A method for acquiring quality of experience of a telecommunication service is provided, including:

acquiring multiple groups of original KQI vectors and a QOE value corresponding to each group of original KQI vectors in the multiple groups of original KQI vectors;

analyzing a relationship between the multiple groups of original KQI vectors and QOE values corresponding to the multiple groups of original KQI vectors to establish a function relationship between KQI vectors and QOE values corresponding to the KQI vectors; and acquiring a current KQI vector, and applying the function relationship between the KQI vectors and the QOE values corresponding to the KQI vectors to obtain a current QOE value corresponding to the current KQI vector.

A method for ensuring QOE of a telecommunication service is provided, including:

acquiring multiple groups of original KQI vectors and a QOE value corresponding to each group of original KQI vectors in the multiple groups of original KQI vectors, where each group of original KQI vectors includes original KQI values corresponding to different KQI classes;

analyzing a relationship between original KQI values corresponding to the same KQI class in the multiple groups of original KQI vectors and the QOE values corresponding to the original KQI vectors to establish a function relationship between original KQI values corresponding to the same KQI class and the QOE values corresponding to the original KQI vectors;

according to a preset QOE threshold value, applying the function relationship to determine a KQI threshold value corresponding to a certain KQI class; and according to the KQI threshold value corresponding to the certain KQI class, adjusting a current KQI value corresponding to the certain KQI class to ensure that a current QOE value of the telecommunication service complies with the preset QOE threshold value.

A method for ensuring QOE of a telecommunication service is provided, including:

acquiring multiple groups of original KQI vectors and a QOE value corresponding to each group of original KQI vectors in the multiple groups of original KQI vectors, where each group of original KQI vectors includes original KQI values corresponding to different KQI classes;

analyzing a relationship between original KQI values corresponding to the same KQI class in the multiple groups of original KQI vectors and QOE values corresponding to the original KQI vectors to establish a function relationship between the original KQI values corresponding to the same KQI class and the QOE values corresponding to the original KQI vectors;

acquiring a current KQI value under a certain KQI class, and applying the function relationship to determine a pre-estimated QOE value corresponding to the current KQI value;

comparing the pre-estimated QOE value corresponding to the current KQI value with a preset QOE threshold value to determine whether the pre-estimated QOE value corresponding to the current KQI value is less than the QOE threshold value;

if the pre-estimated QOE value corresponding to the current KQI value is less than the QOE threshold value, applying a function relationship between the KQI values corresponding to the same KQI class and the QOE values corresponding to the KQI vectors according to the pre-estimated QOE value corresponding to the current KQI value to determine a theoretical KQI value corresponding to the pre-estimated QOE value corresponding to the current KQI value under each KQI class;

comparing the determined theoretical KQI value corresponding to the pre-estimated QOE value corresponding to the current KQI value under each KQI class with a preset KQI threshold value in the KQI class, and determining a KQI class under which the theoretical KQI value is most approximate to the preset KQI threshold value as a key KQI factor for resulting in a case where the pre-estimated QOE value is less than the preset QOE threshold value; and adjusting the determined key KQI factor to ensure that a current QOE value of the telecommunication service complies with the preset QOE threshold value.

An apparatus for acquiring QOE of a telecommunication service is provided, including:

a parameter acquiring module, configured to acquire multiple groups of original KQI vectors and a QOE value corresponding to each group of original KQI vectors in the multiple groups of original KQI vectors;

a modeling module, configured to analyze a relationship between the multiple groups of original KQI vectors and QOE values corresponding to the multiple groups of original KQI vectors to establish a function relationship between KQI vectors and QOE values corresponding to the KQI vectors; and a QOE calculating module, configured to acquire a current KQI vector, and apply the function relationship between the KQI vectors and the QOE values corresponding to the KQI vectors to obtain a current QOE value corresponding to the current KQI vector.

An apparatus for ensuring QOE of a telecommunication service is provided, including:

a parameter acquiring module, configured to acquire multiple groups of original KQI vectors and a QOE value corresponding to each group of original KQI vectors in the multiple groups of original KQI vectors, where each group of original KQI vectors includes original KQI values corresponding to different KQI classes;

a modeling module, configured to analyze a relationship between original KQI values corresponding to a same KQI class in the multiple groups of original KQI vectors and QOE values corresponding to the original KQI vectors to establish a function relationship between the original KQI values corresponding to the same KQI class and the QOE values corresponding to the original KQI vectors;

a KQI threshold value acquiring module, configured to: according to a preset QOE threshold value, apply the function relationship to determine a KQI threshold value corresponding to a certain KQI class; and a KQI adjusting module, configured to: according to the KQI threshold value corresponding to the certain KQI class, adjust a current KQI value corresponding to the certain KQI class to ensure that a current QOE value of the telecommunication service complies with the preset QOE threshold value.

An apparatus for ensuring QOE of a telecommunication service is provided, including:

a parameter acquiring module, configured to acquire multiple groups of original KQI vectors and a QOE value corresponding to each group of original KQI vectors in the multiple groups of original KQI vectors, where each group of original KQI vectors includes original KQI values corresponding to different KQI classes;

a modeling module, configured to analyze a relationship between original KQI values corresponding to a same KQI class in the multiple groups of original KQI vectors and QOE values corresponding to the original KQI vectors to establish a function relationship between the original KQI values corresponding to the same KQI class and the QOE values corresponding to the original KQI vectors;

a QOE value pre-estimating module, configured to acquire a current KQI value under a certain KQI class, and apply the function relationship to determine a pre-estimated QOE value corresponding to the current KQI value;

a QOE value comparing module, configured to compare the pre-estimated QOE value corresponding to the current KQI value with a preset QOE threshold value to determine whether the pre-estimated QOE value corresponding to the current KQI value is less than the QOE threshold value;

a theoretical KQI acquiring module, configured to: if the pre-estimated QOE value corresponding to the current KQI value is less than the QOE threshold value, determine a theoretical KQI value corresponding to the pre-estimated QOE value corresponding to the current KQI value under each KQI class by applying a function relationship between the KQI values corresponding to the same KQI class and the QOE values corresponding to the KQI vectors and according to the pre-estimated QOE value corresponding to the current KQI value;

a key KQI determining module, configured to compare the determined theoretical KQI value corresponding to the pre-estimated QOE value corresponding to the current KQI value under each KQI class and a preset KQI threshold value in each KQI class, and determine a KQI class under which the theoretical KQI value is most approximate to the preset KQI threshold value as a key KQI factor for resulting in a case where the pre-estimated QOE value is less than the preset QOE threshold value; and a KQI adjusting module, configured to adjust the determined key KQI factor to ensure that a current QOE value of the telecommunication service complies with the preset QOE threshold value.

Through the method and apparatus for acquiring quality of experience of a telecommunication service provided in the embodiments of the present invention, the correspondence between KQI and QOE is established by acquiring KQIs and the corresponding QOE, and QOE assessment can be objectively and quickly implemented by acquiring a current KQI and the correspondence between KQI and QOE, and KQIs can be directly used to evaluate the objective quality of service. By establishing the correspondence between KQI and QOE, KQIs that affect the QOE can be objectively and accurately found, and the corresponding QOE is evaluated accordingly after KQI values are acquired. The QOE acquired through this means is capable of objectively and accurately reflecting the quality status of the service. In addition, through the method and apparatus for ensuring QOE of a telecommunication service, whether the current QOE meets requirements is monitored through the correspondence between KQI and QOE, and the QOE is ensured by adjusting KQIs.

DETAILED DESCRIPTION OF THE EMBODIMENTS

An embodiment of the present invention provides a method for acquiring quality of experience of a telecommunication service. The method includes:

acquiring multiple groups of original KQI vectors and a QOE value corresponding to each group of original KQI vectors in the multiple groups of original KQI vectors;

analyzing a relationship between the multiple groups of original KQI vectors and QOE values corresponding to the multiple groups of original KQI vectors to establish a function relationship between KQI vectors and QOE values corresponding to the KQI vectors; and acquiring a current KQI vector, and applying the function relationship between the KQI vectors and the QOE values corresponding to the KQI vectors to obtain a current QOE value corresponding to the current KQI vector.

In the method for acquiring quality of experience of a telecommunication service provided in this embodiment of the present invention, by acquiring multiple groups of original KQIs and a QOE value corresponding to each of the original KQI vectors in the multiple groups of original KQIs to establish a function relationship between KQI vectors and QOE values, and by acquiring the current KQI vector and applying the established function relationship between KQI vectors and QOE values to acquire the current QOE value, QOE evaluation can be implemented objectively and quickly. As KQI vectors can be directly used to evaluate the objective quality of a service, the quality status of the service can be objectively and accurately reflected by establishing the correspondence between the KQI vectors and the QOEs.

Figure 1:
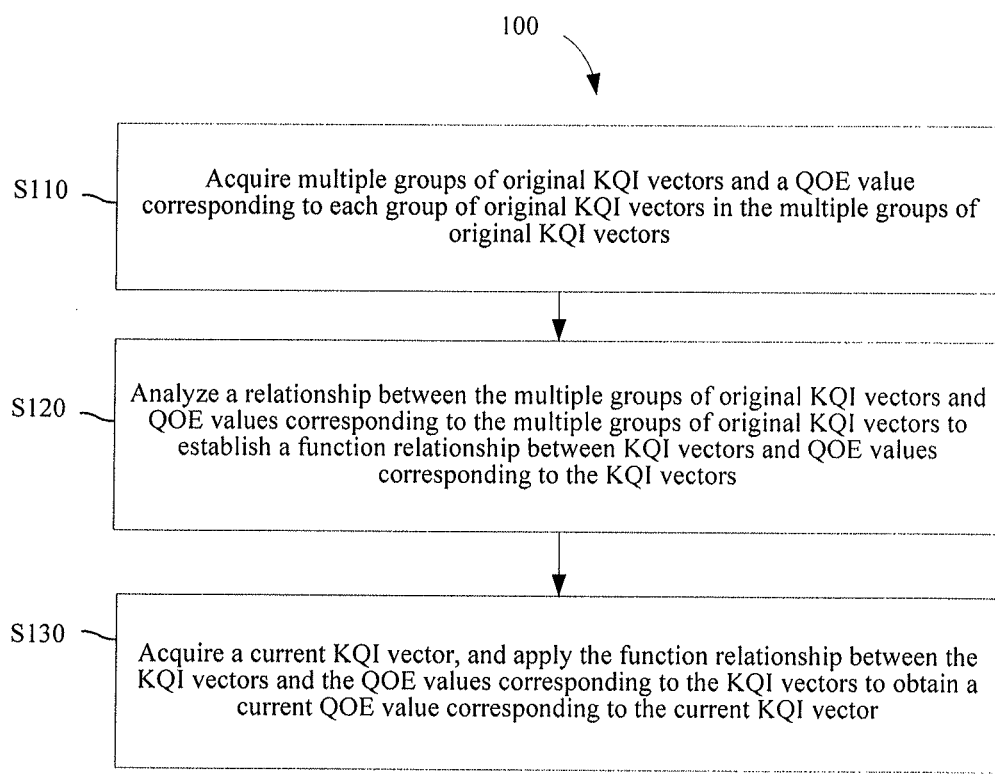
FIG. 1 is a block diagram of a method for acquiring quality of experience of a telecommunication service according to an embodiment of the present invention.

FIG. 1 is a block diagram of a method 100 for acquiring quality of experience of a telecommunication service according to an embodiment of the present invention. The method includes:

S110: Acquire multiple groups of original KQI vectors and a QOE value corresponding to each group of original KQI vectors in the multiple groups of original KQI vectors.

The quality index of service of the QOE value is a key performance index (Key Performance Index, KPI) of a network element, and it can be monitored by a KQI monitoring apparatus. In this embodiment of the present invention, the KQI monitoring apparatus performs individual user-level monitoring for KQIs of multiple users at the same time, that is, monitors KQIs of each user. The KQI monitoring result of each user is represented by the KQI vector constituted by KQI values of different classes or properties. The KQI vector obtained through the direct monitoring performed by the KQI monitoring apparatus is called an original KQI vector, The original KQI vector usually includes multiple composition elements or factors, that is, KQI values of different classes or properties. For example, the KQI vector of a voice service may include caller connection success rate, caller access duration, call drop rate, and voice quality; the KQI vector of a web browsing service may include access success rate, access duration, refresh success rate, refresh duration, drop rate, and average downloading speed; the KQI vector of a short messaging service (Short Messaging Service, SMS) may include sending delay and sending success rate. It is understandable that, according to features of different telecommunication services, the KQI vector can be customized.

After the original KQI vectors are acquired, corresponding QOE values need to be acquired according to the acquired original KQI vectors. Specifically, the following methods may be used for acquisition:

Method for Acquiring QOE Values (1)

Figure 2:
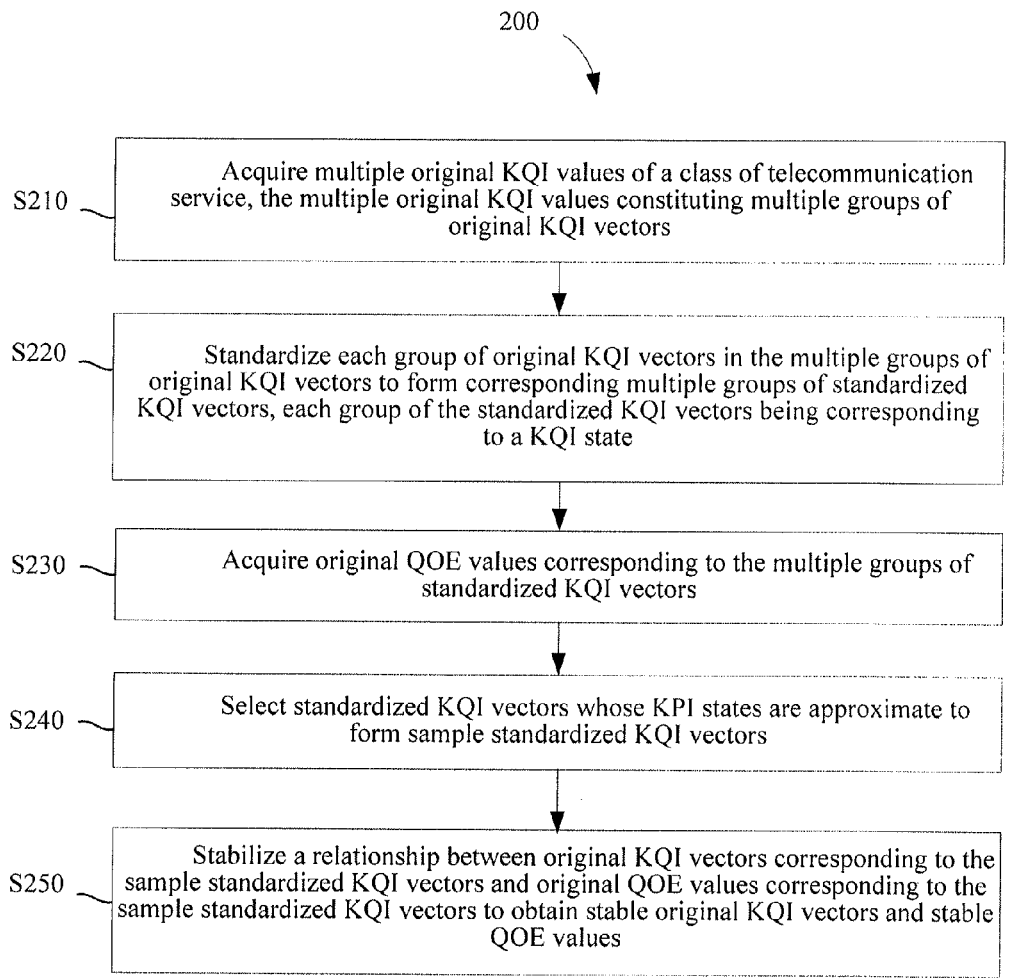
FIG. 2 is a block diagram of a method for acquiring a QOE value in the method for acquiring quality of experience of the telecommunication service shown in FIG. 1.

As shown in FIG. 2, the method 200 for acquiring multiple groups of original KQI vectors and a QOE value corresponding to each group of original KQI vectors in the multiple groups of original KQI vectors specifically includes the following steps:

S210: Acquire multiple original KQI values of a class of telecommunication service, the multiple original KQI values constituting multiple groups of original KQI vectors.

In order to accurately and objectively obtain the correspondence between original KQI vectors and QOEs, proper evaluation samples are required. That is, enough original KQI values needs to serve as samples for subsequent analysis. Therefore, multiple KQI values are gathered by acquiring a KQI value for each of multiple users. In addition, the KQI classes or properties corresponding to different services are different. Therefore, multiple KQI values of a certain class, that is, the same class, of telecommunication service, need to be determined and acquired to constitute an original KQI vector.

S220: Standardize each group of original KQI vectors in the multiple groups of original KQI vectors to form corresponding multiple groups of standardized KQI vectors, each group of standardized KQI vectors being corresponding to a KPI state.

The same original KQI vector includes original KQI values of multiple different classes or properties, and these multiple original KQI values that are included in the same KQI vector cannot be directly compared with each other. Therefore, in order to have the multiple original KQI values contained in the same KQI vector mutually comparable or capable of comparing with a uniform standard, each group of original KQI vectors in the multiple groups of original KQI vectors need to be standardized. Each group of standardized KQI vectors is corresponding to a KPI state; the KPI state is a space characteristic represented by the standardized KQI vectors in the vector space constituted by the standardized KQI vectors.

Specifically, the standardizing each group of original KQI vectors in the multiple groups of original KQI vectors to form corresponding multiple groups of standardized KQI vectors may include:

converting original KQI values in each of the original KQI vectors through formula (a) into standard scores, or z scores, to acquire a standardized KQI vector corresponding to each original KQI vector;

$$z = \frac{x - \bar{x}}{s} \quad (a)$$

where, x is an original KQI value of an original KQI vector, $\bar{x}$ is an average value of multiple original KQI values in the original KQI vector, and s is a standard deviation of multiple original KQI vectors in the original KQI vector; through the preceding method, the original KQI vector is accordingly converted into a standardized KQI vector.

S230: Acquire original QOE values corresponding to the multiple groups of standardized KQI vectors.

Figure 3:
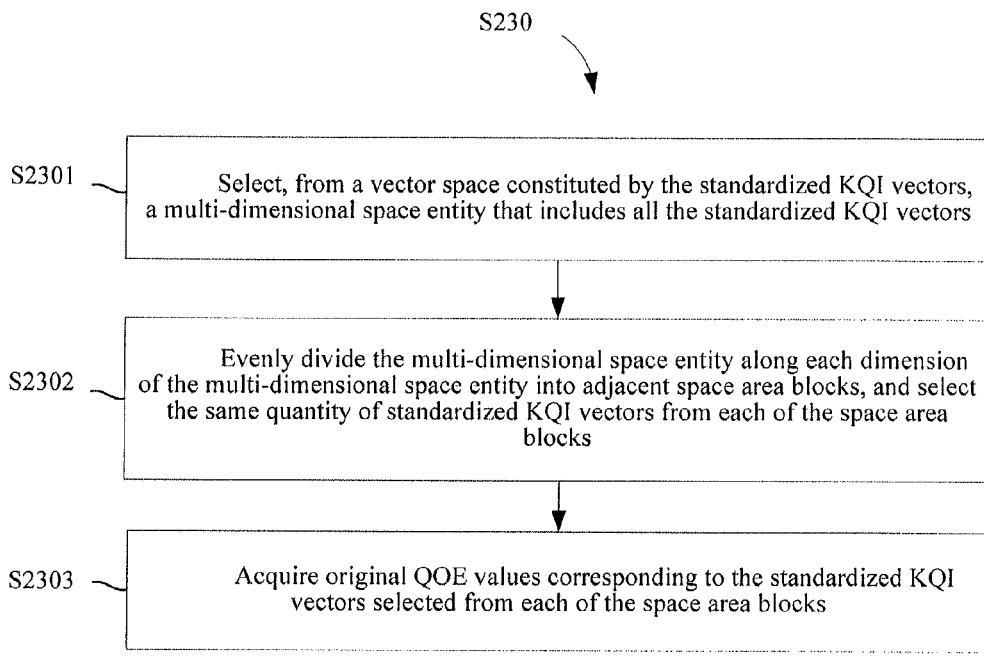
FIG. 3 is a block diagram of acquiring original QOE values corresponding to the multiple groups of standardized KQI vectors in the method for acquiring the QOE value shown in FIG. 2.

After standardized KQI vectors are acquired, users corresponding to the multiple groups of standardized KQI vectors are interviewed and surveyed to acquire the original QOE values corresponding to the multiple groups of standardized KQI vectors. In order that the original QOE values are properly and evenly distributed, as shown in FIG. 3, the acquiring the original QOE values corresponding to the multiple groups of standardized KQI vectors may specifically include the following steps:

S2301: Select, from the vector space constituted by the standardized KQI vectors, a multi-dimensional space entity that includes all standardized KQI vectors, where each dimension of the multi-dimensional space entity includes a minimum value, a maximum value, and a value between the minimum value and the maximum value that are in the standardized KQI vectors and fall on the dimension.

Each of the standardized KQI vectors constitutes an M-dimensional (multidimensional) vector space according to the number M of standardized KQI values included therein. A multidimensional space entity that includes all the standardized KQI vectors is selected from the multidimensional vector space. It is understandable that, the multidimensional space entity may be an enclosed area in a three-dimensional space, or an enclosed area in a super space, such as a four-dimension space or a five-dimension space. In each of the vector spaces, the acquired multidimensional space entity is capable of covering any one of the standardized KQI vectors in the standardized KQI vector space to ensure that the standard vectors covered by the acquired multidimensional space entity are complete and accurate.

S2302: Evenly divide the multi-dimensional space entity along each dimension of the multi-dimensional space entity into adjacent space area blocks, and select the same quantity of standardized KQI vectors from each of the space area blocks.

In order to take each distribution case of multiple KQI vectors included in the multidimensional space entity in the multidimensional space entity into account, that is, to acquire corresponding QOE values, the multi-dimensional space entity is evenly divided through the preceding step along each dimension of the multi-dimensional space entity into multiple adjacent space area blocks, and the same quantity of standardized KQI vectors are selected from each of the space area blocks to serve as survey objects.

S2303: Acquire original QOE values corresponding to the standardized KQI vectors selected from each of the space area blocks.

As KQI values are not evenly distributed, a requirement on a full view of a relationship between KQIs and QOE values can be relatively accurately reflected by selecting the standardized KQI vectors and surveying users corresponding to the selected standardized KQI vectors, and survey resources can be saved.

After the original QOE values are acquired, the method 200 for acquiring QOE values specifically includes:

S240: Select the standardized KQI vectors whose KPI states are approximate to form sample standardized KQI vectors.

As user scores, that is, QOE values (MoS scores), are random, in order to obtain a QOE value for a voice clip, this voice clip needs to be evaluated for multiple times to acquire the QOE value. The QOE values acquired in the multiple times of evaluation are averaged to acquire an average QOE value, and then the relatively stable correspondence between a QOE value and KQI can be acquired only. However, in live network environment, it is almost impossible that the same KPI state occurs for multiple times. Therefore, it needs to find an approximate KPI state to replace a repeated KPI state to form a sample standardized KQI vector.

Figure 4:
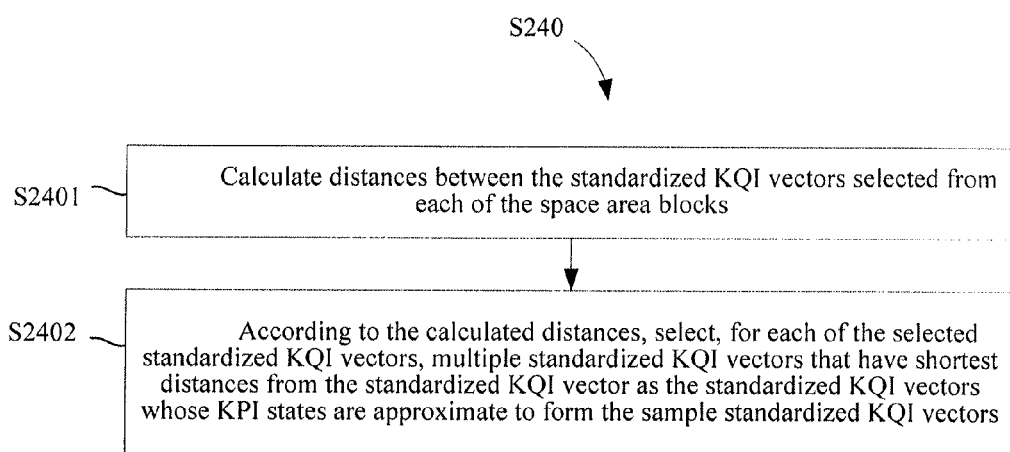
FIG. 4 is a block diagram of a method for acquiring standardized KQI vectors whose KPI states are approximate in the method for acquiring quality of experience of the telecommunication service shown in FIG. 1.

Specifically, corresponding to the method for acquiring the original QOE values corresponding to the multiple groups of standardized KQI vectors disclosed in steps S2301 to S2303, as shown in FIG. 4, the step 240 of selecting the standardized KQI vectors whose KPI states are approximate to form sample standardized KQI vectors specifically includes:

S2401: Calculate distances between the standardized KQI vectors selected from each of the space area blocks.

The distances between the standardized vectors may be calculated by using a Euclidean distance formula $\sqrt{(x_1-x_2)^2+(y_1-y_2)^2+...}$, where x and y represent KQI values of different KQI classes in the standardized KQI vectors. It is understandable that the calculation of the distances between the standardized KQI vectors is not confined to the calculation performed according to the Euclidean distance formula. Other formula for calculating vector space distances may also be used.

S2402: According to the calculated distances, select, for each of the selected standardized KQI vectors, multiple standardized KQI vectors that have shortest distances from the standardized KQI vector as the standardized KQI vectors whose KPI states are approximate to form the sample standardized KQI vectors.

Specifically, L (for example, 30 or greater than 30) standardized KQI vectors may be selected for each of the standardized KQI vectors, where L standardized KQI vectors are adjacent to it. The selection method is to start selecting a KQI vector with the smallest distance from the standardized KQI vector, and count the number until the count reaches L. The count value L is merely selected at random to describe the technical solution of the present invention. The number of selected KQI vectors is not confined by the preceding count value.

When the sample standardized KQI vectors are acquired, the method 200 for acquiring QOE values specifically includes:

S250: Stabilize a relationship between original KQI vectors corresponding to the sample standardized KQI vectors and original QOE values corresponding to the sample standardized KQI vectors to obtain stable original KQI vectors and stable QOE values.

As described above, as KQI values are not evenly distributed, but are distributed in the mildly good states at most times, in order to obtain the correspondence between stable KQIs and stable QOE values, the sample standardized KQI vectors whose KPI states are approximate and the original QOE values corresponding to the sample standardized KQI vectors need to be stabilized. Specifically, the stabilizing the relationship between the original KQI vectors corresponding to the sample standardized KQI vectors and the original QOE values corresponding to the sample standardized KQI vectors to obtain stable original KQI vectors and stable QOE values includes:

calculating the average value or probability distribution of the original KQI vectors corresponding to the sample standardized KQI vectors as a stable original KQI vector, and calculating the average value or probability distribution of the original QOE values corresponding to the sample standardized KQI vectors as a stable QOE value.

Method for Acquiring QOE Values (2)

Figure 5:
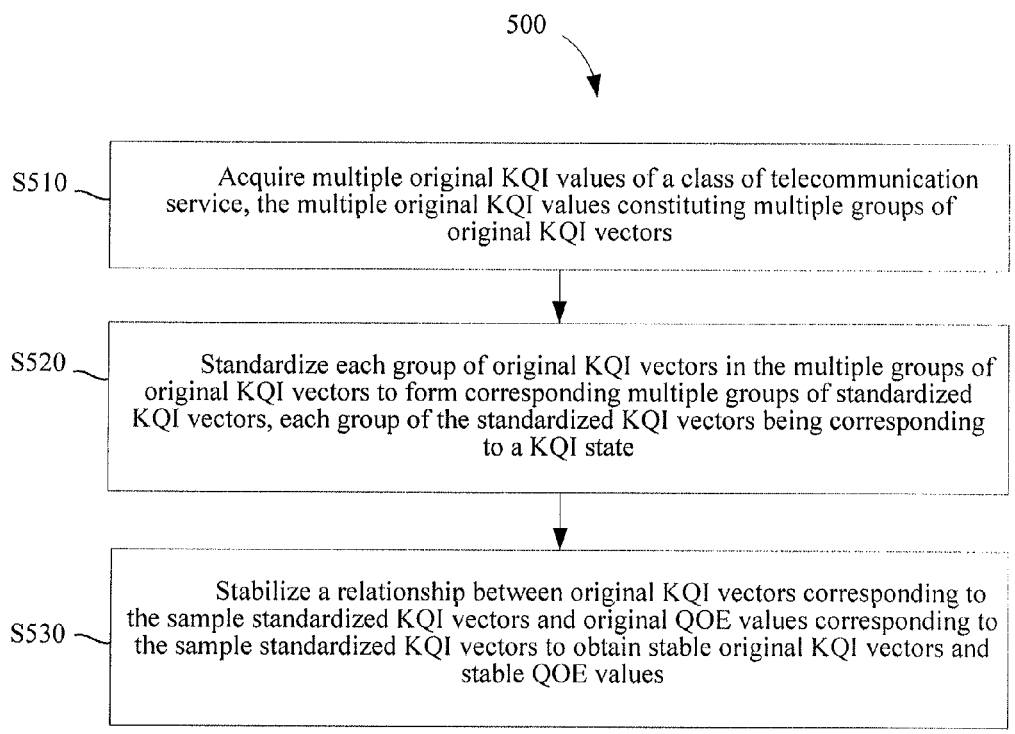
FIG. 5 is a block diagram of another method for acquiring a QOE value in the method for acquiring quality of experience of the telecommunication service shown in FIG. 1.

As shown in FIG. 5, the method 500 for acquiring multiple groups of original KQI vectors and a QOE value corresponding to each group of original KQI vectors in the multiple groups of original KQI vectors specifically includes the following steps:

S510: Acquire multiple original KQI values of a class of telecommunication service, the multiple original KQI values constituting multiple groups of original KQI vectors.

In order to accurately and objectively obtain the correspondence between original KQI vectors and QOE, proper evaluation samples are required. That is, enough KQI values need to serve as samples for subsequent analysis. Therefore, multiple KQI values are gathered by acquiring a KQI value for each of multiple users. In addition, the KQI classes or properties corresponding to different services are different. Therefore, multiple KQI values of a certain class, that is, the same class, of telecommunication service, need to be determined and acquired to constitute the original KQI vectors.

S520: Standardize each group of original KQI vectors in the multiple groups of original KQI vectors to form corresponding multiple groups of standardized KQI vectors, each group of standardized KQI vectors being corresponding to a KPI state.

The same original KQI vector includes original KQI values of multiple different classes or properties, and these multiple original KQI values that are included in the same KQI vector cannot be directly compared with each other. Therefore, in order to have the multiple original KQI values contained in the same KQI vector mutually comparable or capable of comparing with a uniform standard, each group of original KQI vectors in the multiple groups of original KQI vectors need to be standardized. Each group of standardized KQI vectors is corresponding to a KPI state; the KPI state is a space characteristic represented by the standardized KQI vectors in the vector space constituted by the standardized KQI vectors.

Specifically, the standardizing each group of original KQI vectors in the multiple groups of original KQI vectors to form corresponding multiple groups of standardized KQI vectors may include:

converting original KQI values in each of the original KQI vectors through formula (a) into standard scores, or z scores, to acquire a standardized KQI vector corresponding to each original KQI vector;

$$z = \frac{x - \bar{x}}{s} \quad (a)$$

where, x is an original KQI value of an original KQI vector, $\bar{x}$ is an average value of multiple original KQI values in the original KQI vector, and s is a standard deviation of multiple original KQI vectors in the original KQI vector; through the preceding method, the original KQI vector is accordingly converted into a standardized KQI vector.

S530: Select the standardized KQI vectors whose KPI states are evenly distributed to form sample standardized KQI vectors.

As user scores, that is, QOE values (MoS scores), are random, in order to obtain a QOE value for a voice clip, this voice clip needs to be evaluated for multiple times to acquire the QOE value. The QOE values acquired in the multiple times of evaluation are averaged to acquire an average QOE value, and then the relatively stable correspondence between a QOE value and KQI can be acquired only. However, in live network environment, it is almost impossible that the same KPI state occurs for multiple times, and distribution of KPI states in the live network environment basically is approximate to normal distribution. That is, KPI states may basically be distributed in a certain state region, and KQIs in this region basically follow the pattern of even distribution. Therefore, after the standardized KQI vectors whose KPI states are evenly distributed and the original QOE values corresponding to the standardized KQI vectors are selected, an actual relationship between KQI and the QOE can be reflected thereby.

Figure 6:
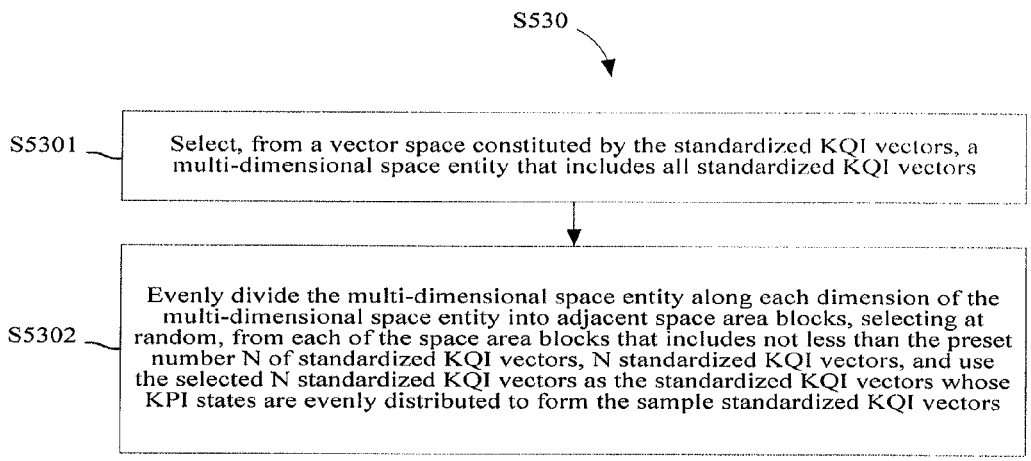
FIG. 6 is a block diagram of a method for selecting the standardized KQI vectors whose KPI states are evenly distributed in the another method for acquiring the QOE value shown in FIG. 5.

Specifically, as shown in FIG. 6, the step S530 of selecting the standardized KQI vectors whose KPI states are evenly distributed to form sample standardized KQI vectors may specifically include:

S5301: Select, from the vector space constituted by the standardized KQI vectors, a multi-dimensional space entity that includes all standardized KQI vectors, where each dimension of the multi-dimensional space entity includes a minimum value, a maximum value, and a value between the minimum value and the maximum value that are in the standardized KQI vectors and fall on the dimension.

Each of the standardized KQI vectors constitutes an M-dimensional (multidimensional) vector space according to the number M of standardized KQI values included therein. A multidimensional space entity that includes all KQI vectors is selected from the multidimensional vector space. It is understandable that, the multidimensional space entity may be an enclosed area in a three-dimensional space, or an enclosed area in a super space, such as a four-dimension space or five-dimension space. In each of the vector spaces, the acquired multidimensional space entity is capable of covering any one of the standardized KQI vectors in the standardized KQI vector space to ensure that the standard vectors covered by the acquired multidimensional space entity are complete and accurate.

S5302: Evenly divide the multi-dimensional space entity along each dimension of the multi-dimensional space entity into adjacent space area blocks, select at random, from each of the space area blocks that includes not less than the preset number N of standardized KQI vectors, N standardized KQI vectors, and use the selected N standardized KQI vectors as the standardized KQI vectors whose KPI states are evenly distributed, to form the sample standardized KQI vectors.

The KPI states are basically distributed in a certain state area in a centralized manner, and the KQIs in this area basically follow the pattern of even distribution. Therefore, after the standardized KQI vectors whose KPI states are evenly distributed and the QOE values corresponding to the standardized KQI vectors are selected, an actual relationship between KQI and the QOE can be reflected. After the multidimensional space entity that includes all the KQI vectors is evenly divided along each dimension of the multidimensional space entity into adjacent space area blocks, it may be regarded that a space area block that includes the preset number N of standardized KQI vectors falls within the area where the KQI states are distributed in a centralized manner. The preset number N is preferably larger than or equal to 30. Therefore, by selecting at random, from each of the space area blocks that includes not less than the preset number N of standardized KQI vectors, N standardized KQI vectors, and using the selected N standardized KQI vectors as the standardized KQI vectors whose KPI states are evenly distributed, a requirement for selecting samples in the method according to the present invention can be met. As KQI values are not evenly distributed, a requirement on a full view of a relationship between KQIs and QOE values can be relatively accurately reflected by selecting the standardized KQI vectors and surveying users corresponding to the selected standardized KQI vectors, and survey resources can be saved.

After the sample standardized KQI vectors are acquired, the method 500 for acquiring QOE values specifically includes:

S540: Stabilize a relationship between original KQI vectors corresponding to the sample standardized KQI vectors and original QOE values corresponding to the sample standardized KQI vectors to obtain stable original KQI vectors and stable QOE values.

As described above, as KQI values are not evenly distributed, but are distributed in the mildly good states at most times, in order to obtain the correspondence between stable KQIs and stable QOE values, the sample standardized KQI vectors whose KPI states are evenly distributed and the original QOE values corresponding to the sample standardized KQI vectors need to be stabilized. Specifically, the stabilizing the relationship between the original KQI vectors corresponding to the sample standardized KQI vectors and the original QOE values corresponding to the sample standardized KQI vectors to obtain stable original KQI vectors and stable QOE values includes:

After acquiring the multiple groups of original KQI vectors and a QOE value corresponding to each group of original KQI vectors in the multiple groups of original KQI vectors by using each of the methods, the method 100 for acquiring quality of experience of a telecommunication service provided in this embodiment further includes:

S120: Analyze a relationship between the multiple groups of original KQI vectors and QOE values corresponding to the multiple groups of original KQI vectors to establish a function relationship between KQI vectors and QOE values corresponding to the KQI vectors.

After the original KQI vectors and corresponding QOE values are acquired, the correspondence or mapping between the KQI vectors and corresponding QOE values may be acquired through a modeling method. According to the correspondence or mapping, corresponding QOE values can be objectively predicted or acquired by acquiring KQIs in subsequent use.

Further, after the relationship between stable original KQI vectors and the stable QOE values is acquired by using the QOE acquiring method (1) and QOE acquiring method (2), the step S120 specifically further includes:

analyzing a relationship between the stable original KQI vectors and the stable QOE values to establish the function relationship.

Specifically, analyze a relationship between the stable original KQI vectors and the stable QOE values and use a multiple regression modeling method to establish a function relationship between the KQI vectors and QOE values corresponding to the KQI vectors.

Figure 7:
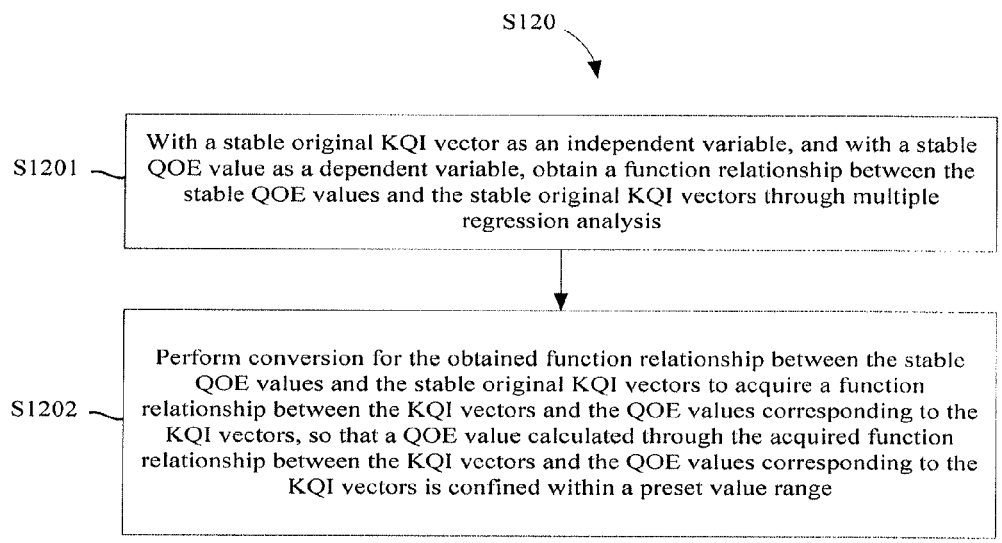
FIG. 7 is a block diagram of a method for establishing the correspondence between the KQI vectors and corresponding QOE values by using a multiple regression modeling method in the method for acquiring quality of experience of the telecommunication service shown in FIG. 1.

As shown in FIG. 7, the step S120 of analyzing the relationship between the stable original KQI vectors and the stable QOE values and using the multiple regression modeling method to establish the function relationship between the KQI vectors and the QOE values corresponding to the KQI vectors specifically includes:

S1201: With a stable original KQI vector as an independent variable, and with a stable QOE value as a dependent variable, obtain a function relationship between the stable QOE values and the stable original KQI vectors through multiple regression analysis.

The function relationship may be expressed as follows:

QOE calculation value=$f(KQI1, KQI2, KQI3, \ldots)$, where f is a function of the QOE calculation value.

S1202: Perform conversion for the obtained function relationship between the stable QOE values and the stable original KQI vectors to acquire a function relationship between the KQI vectors and the QOE values corresponding to the KQI vectors, so that the QOE values calculated according to the acquired function relationship between the KQI vectors and the QOE values corresponding to the KQI vectors are confined within a preset value range.

It is understandable that the preset value range of the QOE values is set according to requirements of surveyors. It is generally from 1 to 5, but may also be set to different value ranges, such as from 1 to 3 and from 1 to 7 according to requirements. The present invention does not make the specific restriction for the QOE values.

The conversion method may be as follows:

Perform tangent conversion and arc tangent conversion in sequence:

$$QOE \text{ value} = \frac{4}{\pi} * \tan^{-1} * \tan\left(\frac{\pi * (f-3)}{4} * \delta\right) + 3$$

where, $0.9 < \delta < 1$, and f is a formula obtained through the multiple regression analysis.

Alternatively, the conversion method may also be converting the function relationship into a piecewise function:

$$QOE \text{ value} = \begin{cases} 1 & (QOE \text{ calculation value} <= 1) \\ f & (1 < QOE \text{ calculation value} < 5) \\ 5 & (QOE \text{ calculation value} >= 5) \end{cases}$$

The meaning of the above piecewise function is as follows: when the QOE calculation value is smaller than or equal to 1, the QOE value is 1; when the QOE calculation value is larger than 1 and smaller than 5, the QOE value is f; when the QOE calculation value is larger than 5, the QOE value is 5.

After the function relationship between the QOE values and the KQIs is established through the above method, the method 100 for acquiring QOE of the telecommunication service in the present invention further includes:

S130: Acquire a current KQI vector, and applying the function relationship between the KQI vectors and the QOE values corresponding to the KQI vectors to obtain a current QOE value corresponding to the current KQI vector.

According to the correspondence between the KQIs and the corresponding QOE values established in step S120, a QOE value corresponding to the current KQI can be acquired, so that the QOE of the telecommunication service is objectively and quickly acquired, the long-term repetitive interview required in traditional QOE evaluation is avoided, thereby helping a carrier directly manage user perception and ensure it, and improving customer satisfaction.

Figure 8:
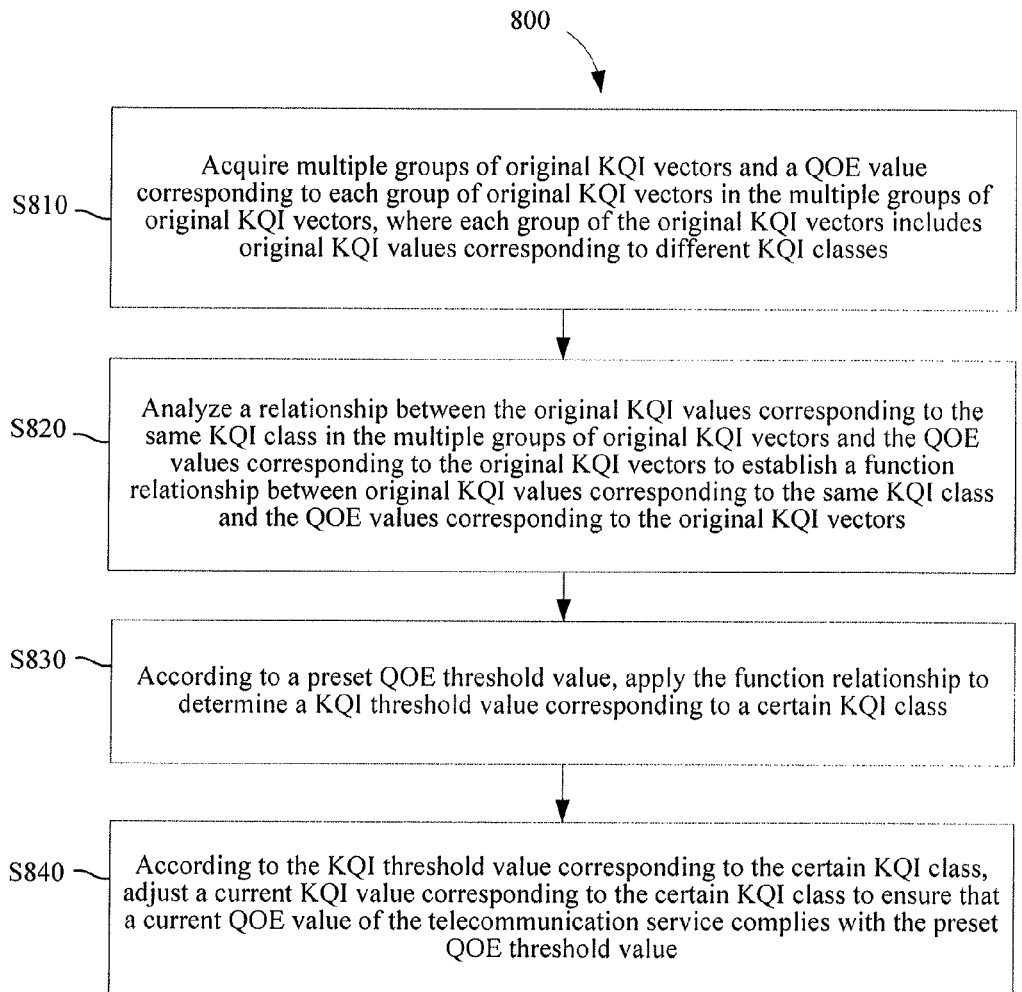
FIG. 8 is a block diagram of a method for ensuring QOE of a telecommunication service according to an embodiment of the present invention.

As shown in FIG. 8, the present invention further provides a method 800 for ensuring QOE of a telecommunication service, including:

S810: Acquire multiple groups of original KQI vectors and a QOE value corresponding to each group of original KQI vectors in the multiple groups of original KQI vectors, where each group of original KQI vectors includes original KQI values corresponding to different KQI classes.

In this step, the acquiring the multiple groups of KQI vectors and the QOE corresponding to each group of original KQI vectors in the multiple groups of original KQI vectors may use a method similar to the QOE value acquiring method (1) and QOE value acquiring method (2) described above. Specifically, a QOE value acquiring method (3) and a QOE value acquiring method (4) may be used for implementation.

Figure 9:
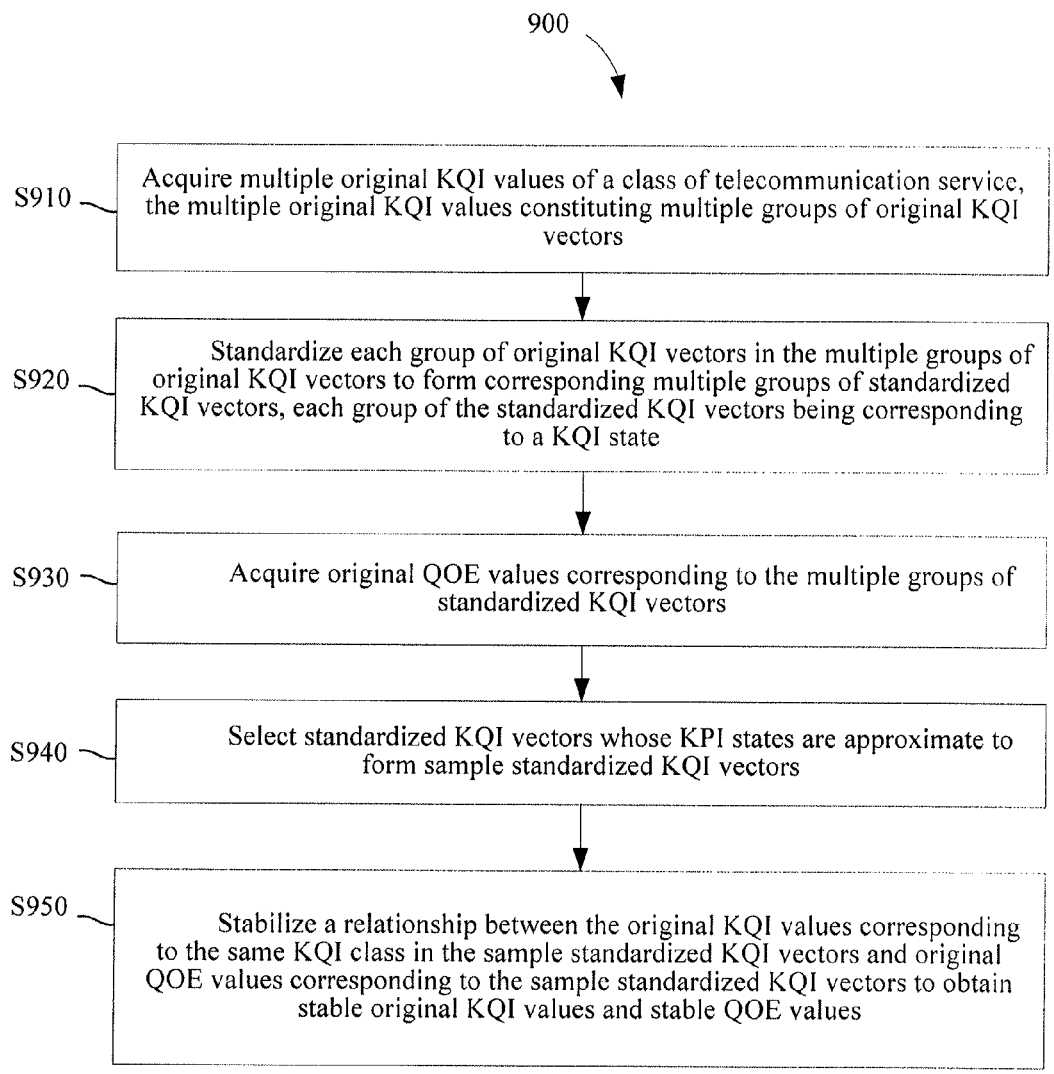
FIG. 9 is a block diagram of a method for acquiring a QOE value in the method for ensuring QOE of the telecommunication service shown in FIG. 8.

As shown in FIG. 9, the QOE value acquiring method (3) includes:

S910: Acquire multiple original KQI values of a class of telecommunication service, the multiple original KQI values constituting multiple groups of original KQI vectors.

S920: Standardize each group of original KQI vectors in the multiple groups of original KQI vectors to form corresponding multiple groups of standardized KQI vectors, each group of standardized KQI vectors being corresponding to a KPI state.

The standardizing step is the same as the standardizing steps S220 and S520 in the QOE value acquiring method (1) and QOE value acquiring method (2), and details are not described herein again.

S930: Acquire original QOE values corresponding to the multiple groups of standardized KQI vectors.

Figure 9A:
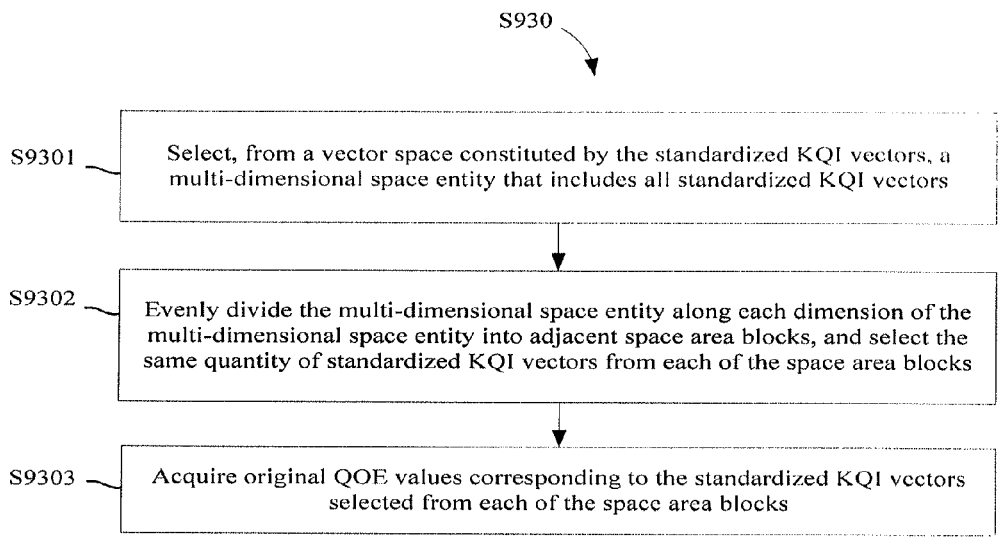
FIG. 9a is a block diagram of acquiring original QOE values corresponding to the multiple groups of standardized KQI vectors in the method for acquiring the QOE value shown in FIG. 9.

As shown in FIG. 9a, the step S930 of acquiring the original QOE values corresponding to the multiple groups of standardized KQI vectors specifically includes:

S9301: Select, from a vector space constituted by the standardized KQI vectors, a multi-dimensional space entity that includes all the standardized KQI vectors, where each dimension of the multi-dimensional space entity includes a minimum value, a maximum value, and a value between the minimum value and the maximum value that are in the standardized KQI vectors and fall on the dimension.

S9302: Evenly divide the multi-dimensional space entity along each dimension of the multi-dimensional space entity into adjacent space area blocks, and select the same quantity of standardized KQI vectors from each of the space area blocks.

s9303: Acquire original QOE values corresponding to the standardized KQI vectors selected from each of the space area blocks.

After the original QOE values corresponding to the multiple groups of standardized KQI vectors are acquired, the QOE value acquiring method (3) further includes:

S940: Select the standardized KQI vectors whose KPI states are approximate to form sample standardized KQI vectors.

Figure 9B:
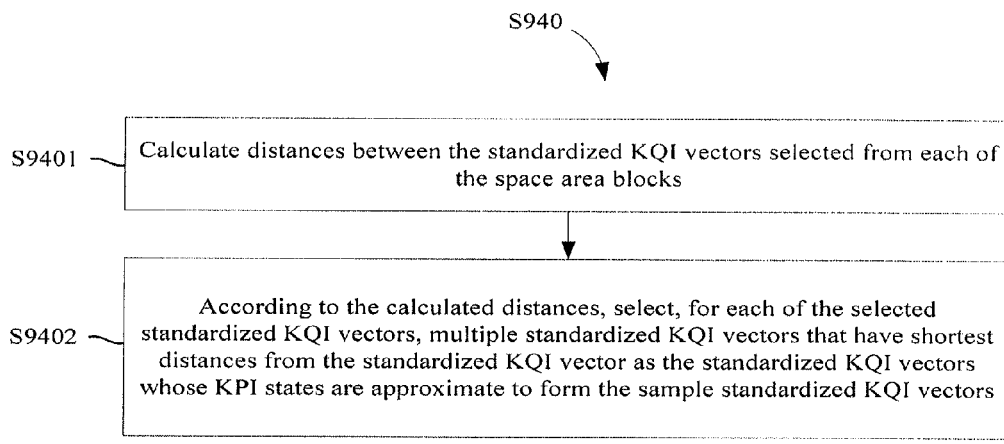
FIG. 9b is a block diagram of a method for selecting the standardized KQI vectors whose KPI states are approximate to form sample standardized KQI vectors in the method for acquiring the QOE value shown in FIG. 9.

As shown in FIG. 9b, the step S940 corresponding to the steps S9301 and S9302 specifically include:

S9401: Calculate distances between the standardized KQI vectors selected from each of the space area blocks.

S9402: According to the calculated distances, select, for each of the selected standardized KQI vectors, multiple standardized KQI vectors that have shortest distances from the standardized KQI vector as the standardized KQI vectors whose KPI states are approximate, to form the sample standardized KQI vectors.

After the sample standardized KQI vectors are acquired, the QOE value acquiring method (3) further includes:

S950: Stabilize a relationship between the original KQI values corresponding to the same KQI class in the sample standardized KQI vectors and original QOE values corresponding to the sample standardized KQI vectors to obtain stable original KQI values and stable QOE values.

Figure 9C:
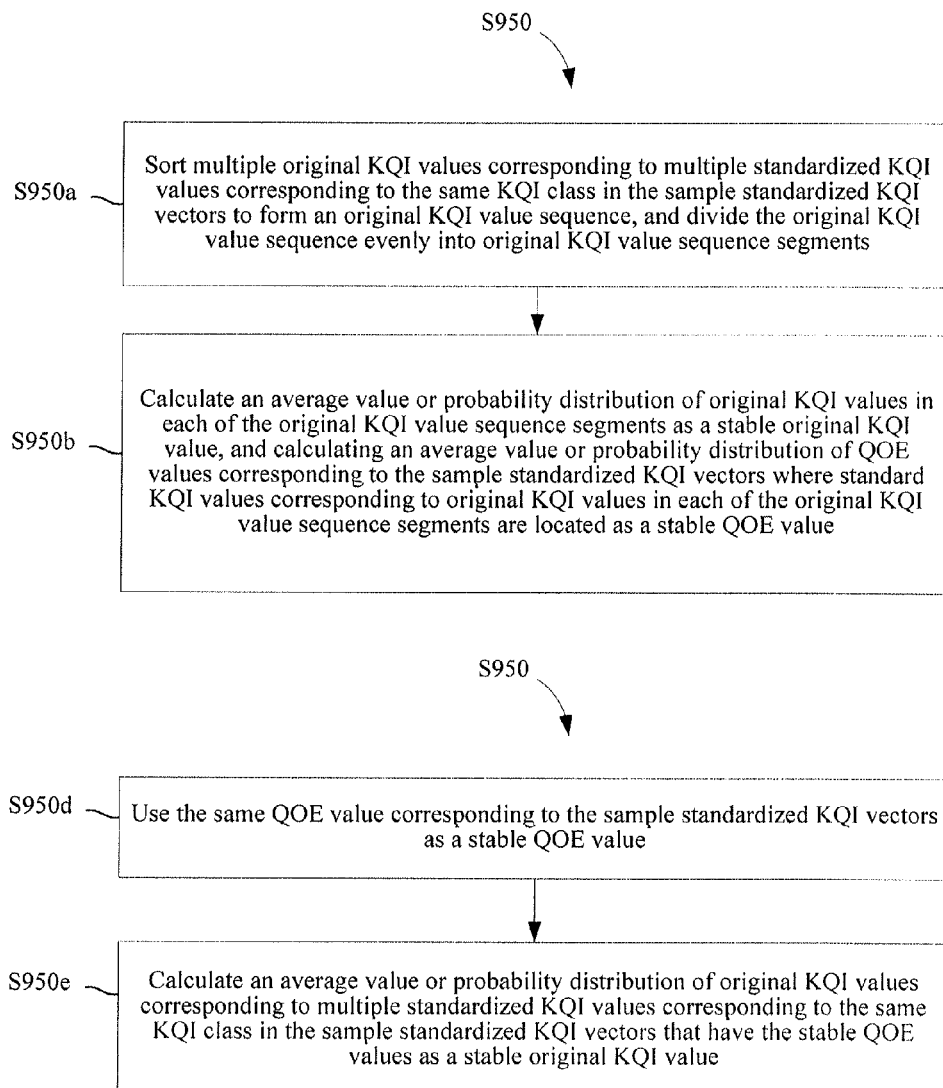
FIG. 9c is a block diagram of a method for stabilizing a relationship between the original KQI values corresponding to the same KQI class in the sample standardized KQI vectors and original QOE values corresponding to the sample standardized KQI vectors to obtain stable original KQI values and stable QOE values in the method for acquiring the QOE value shown in FIG. 9.

As shown in FIG. 9c, the step S950 specifically includes:

S950a: Sort multiple original KQI values corresponding to multiple standardized KQI values corresponding to the same KQI class in the sample standardized KQI vectors to form an original KQI value sequence, and divide the original KQI value sequence evenly into original KQI value sequence segments.

S950b: Calculate the average value or probability distribution of original KQI values in each of the original KQI value sequence segments as a stable original KQI value, and calculate the average value or probability distribution of QOE values corresponding to the sample standardized KQI vectors where standard KQI values corresponding to original KQI values in each of the original KQI value sequence segments are located as a stable QOE value; or S950d: Use the same QOE values corresponding to the sample standardized KQI vectors as the stable QOE values;

S950e: Calculate the average value or probability distribution of original KQI values corresponding to multiple standardized KQI values corresponding to the same KQI class in the sample standardized KQI vectors that have the stable QOE values as a stable original KQI value.

Figure 10:
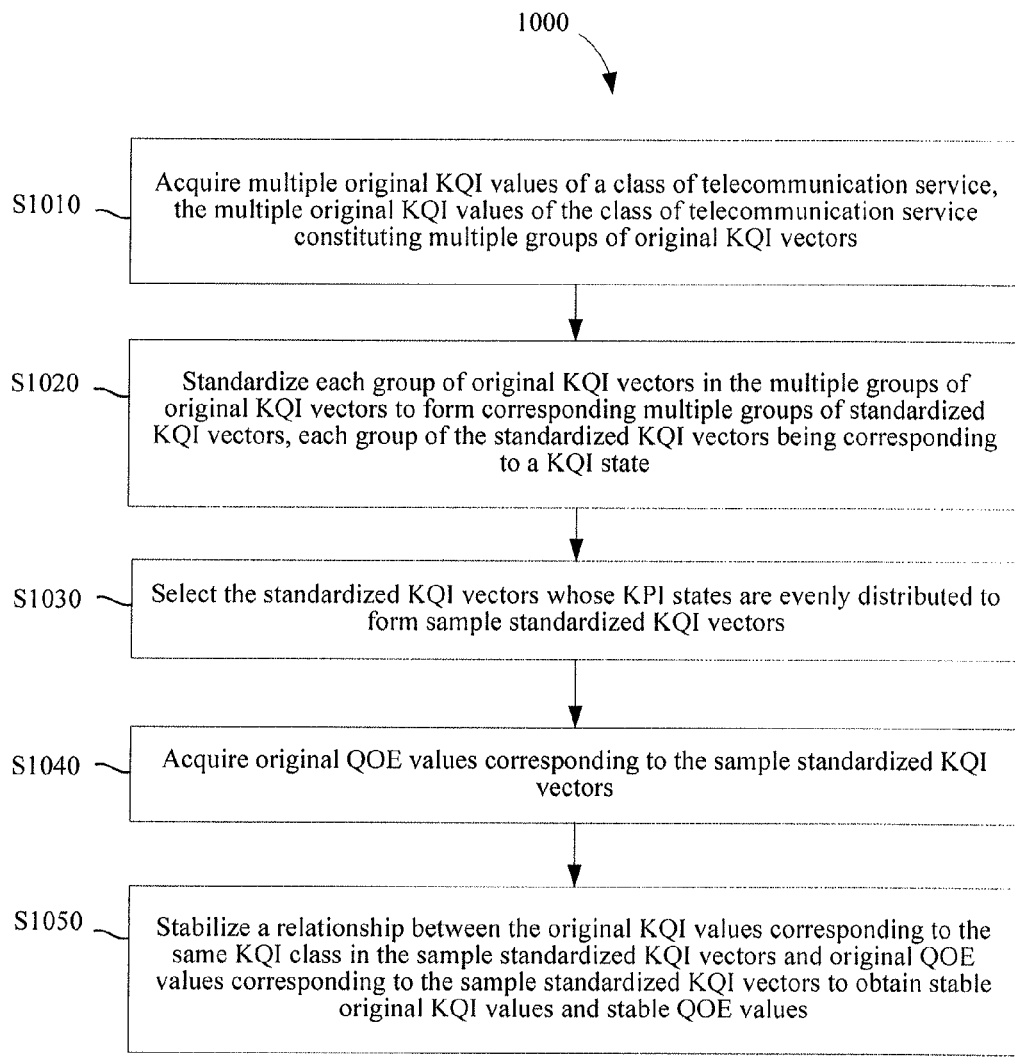
FIG. 10 is a block diagram of another method for acquiring a QOE value in the method for ensuring QOE of the telecommunication service shown in FIG. 8.

As shown in FIG. 10, the QOE value acquiring method 1000 (4) includes:

S1010: Acquire multiple original KQI values of a class of telecommunication service, the multiple original KQI values of the class of telecommunication service constituting multiple groups of original KQI vectors.

S1020: Standardize each group of original KQI vectors in the multiple groups of original KQI vectors to form corresponding multiple groups of standardized KQI vectors, each group of standardized KQI vectors being corresponding to a KPI state.

The standardization step is the same as those in the QOE value acquiring method (1) and QOE value acquiring method (2), and details are not described herein again.

S1030: Select the standardized KQI vectors whose KPI states are evenly distributed, to form sample standardized KQI vectors.

Figure 10A:
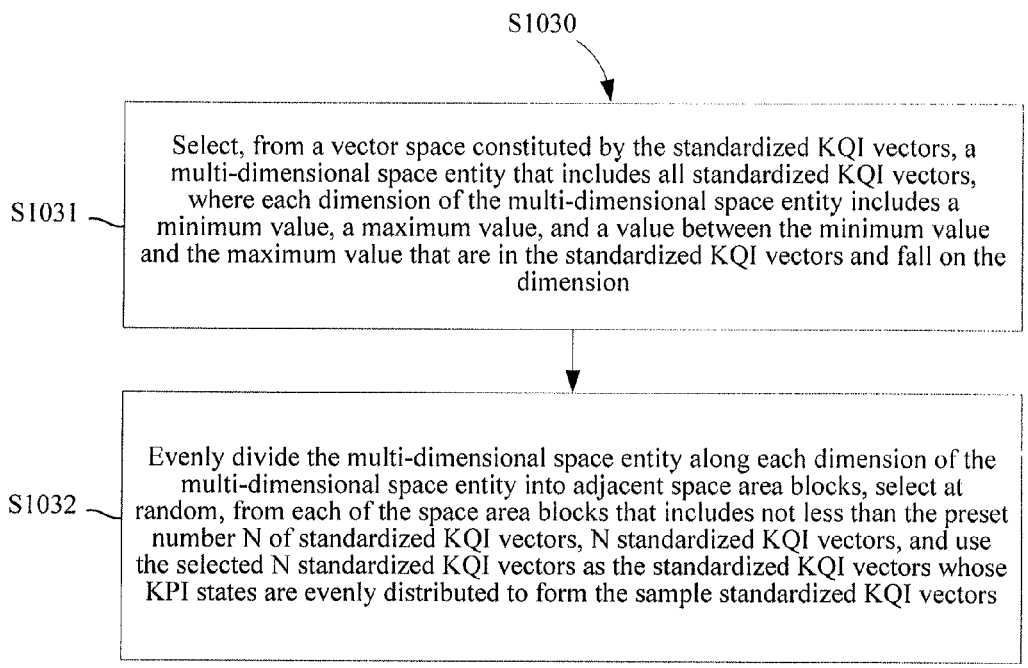
FIG. 10a is a block diagram of a method for selecting the standardized KQI vectors whose KPI states are evenly distributed in the method for acquiring the QOE value shown in FIG. 10.

As shown in FIG. 10a, the step S1030 specifically includes:

S1031: Select, from a vector space constituted by the standardized KQI vectors, a multi-dimensional space entity that includes all the standardized KQI vectors, where each dimension of the multi-dimensional space entity includes a minimum value, a maximum value, and a value between the minimum value and the maximum value that are in the standardized KQI vectors and fall on the dimension.

S1032: Evenly divide the multi-dimensional space entity along each dimension of the multi-dimensional space entity into adjacent space area blocks, select at random, from each of the space area blocks that includes not less than the preset number N of standardized KQI vectors, N standardized KQI vectors, and use the selected N standardized KQI vectors as the standardized KQI vectors whose KPI states are evenly distributed to form the sample standardized KQI vectors.

After the sample standardized KQI vectors are acquired, the QOE value acquiring method (4) further includes:

S1040: Acquire original QOE values corresponding to the sample standardized KQI vectors.

S1050: Stabilize a relationship between original KQI values corresponding to the same KQI class in the sample standardized KQI vectors and original QOE values corresponding to the sample standardized KQI vectors to obtain stable original KQI values and stable QOE values.

The step S1050 specifically may be implemented by using the steps S950a and S950b or S950d and S950e, and details are not described herein again.

After the multiple groups of original KQI vectors and the QOE value corresponding to each group of original KQI vectors in the multiple groups of original KQI vectors are acquired, the method for ensuring QOE of the telecommunication service further includes:

S820: Analyze a relationship between the original KQI values corresponding to the same KQI class in the multiple groups of original KQI vectors and the QOE values corresponding to the original KQI vectors to establish a function relationship between the original KQI values corresponding to the same KQI class and the QOE values corresponding to the original KQI vectors.

Specifically, corresponding to the QOE value acquiring method (3) and QOE value acquiring method (4), the step S820 specifically includes:

analyzing a relationship between the stable original KQI values corresponding to the same KQI class and the stable QOE values corresponding to the stable original KQI values corresponding to the same KQI class to establish the function relationship.

To be more specific, the analyzing the relationship between the stable original KQI values and the stable QOE values to establish the function relationship specifically includes:

analyzing a relationship between the stable original KQI values and the stable QOE values and using a single regression modeling method to establish a function relationship between the original KQI values corresponding to the same KQI class and QOE values corresponding to the original KQI vectors. The using the single regression modeling method to establish the function relationship between the original KQI values corresponding to the same KQI class and QOE values corresponding to the original KQI vectors specifically includes: with a stable QOE value as an independent variable, and with a stable original KQI value as a dependent variable, obtaining the function relationship through regression analysis. Specifically, if a linear relationship is shown between a stable original KQI value and a stable QOE value, the function relationship is as follows: KQI=a*QOE+b;

if a logarithmic relationship is shown between the stable original KQI value and the stable QOE value, the function relationship is as follows: KQI=a*ln(QOE)+b;

if an exponential relationship is shown between the stable original KQI value and the stable QOE value, the function relationship is as follows: KQI=a*$e^{QoE}$+b.

After the function relationship between the original KQI values corresponding to the same KQI class and the QOE values corresponding to the original KQI vectors is obtained, the method 800 for ensuring QOE of the telecommunication service further includes:

S830: According to a preset QOE threshold value, apply the function relationship to determine a KQI threshold value corresponding to a certain KQI class.

According to the relationship between KQI and QOE determined in step S820, a KQI vector threshold value corresponding to a certain KQI class can be acquired according to the preset QOE value. In this way, the KQI that affects a QOE value can be found objectively, and adjustment can be made accordingly, so that the adjusted QOE of the telecommunication service can comply with the preset QOE threshold value.

S840: According to the KQI threshold value corresponding to the certain KQI class, adjust a current KQI value corresponding to the certain KQI class to ensure that a current QOE value of the telecommunication service complies with the preset QOE threshold value.

With the method for ensuring QOE of a telecommunication service provided in this embodiment of the present invention, by pre-establishing a function relationship between KQI values under a certain KQI class and the QOE values corresponding to the KQI vectors where the KQI values are located, and according to a QOE threshold value, a corresponding KQI vector threshold value can be acquired, and then the KQI vector threshold value is used as reference to adjust each KQI value in the telecommunication service, so that the QOE can meet customer requirements, thereby improving customer satisfaction.

Figure 11:
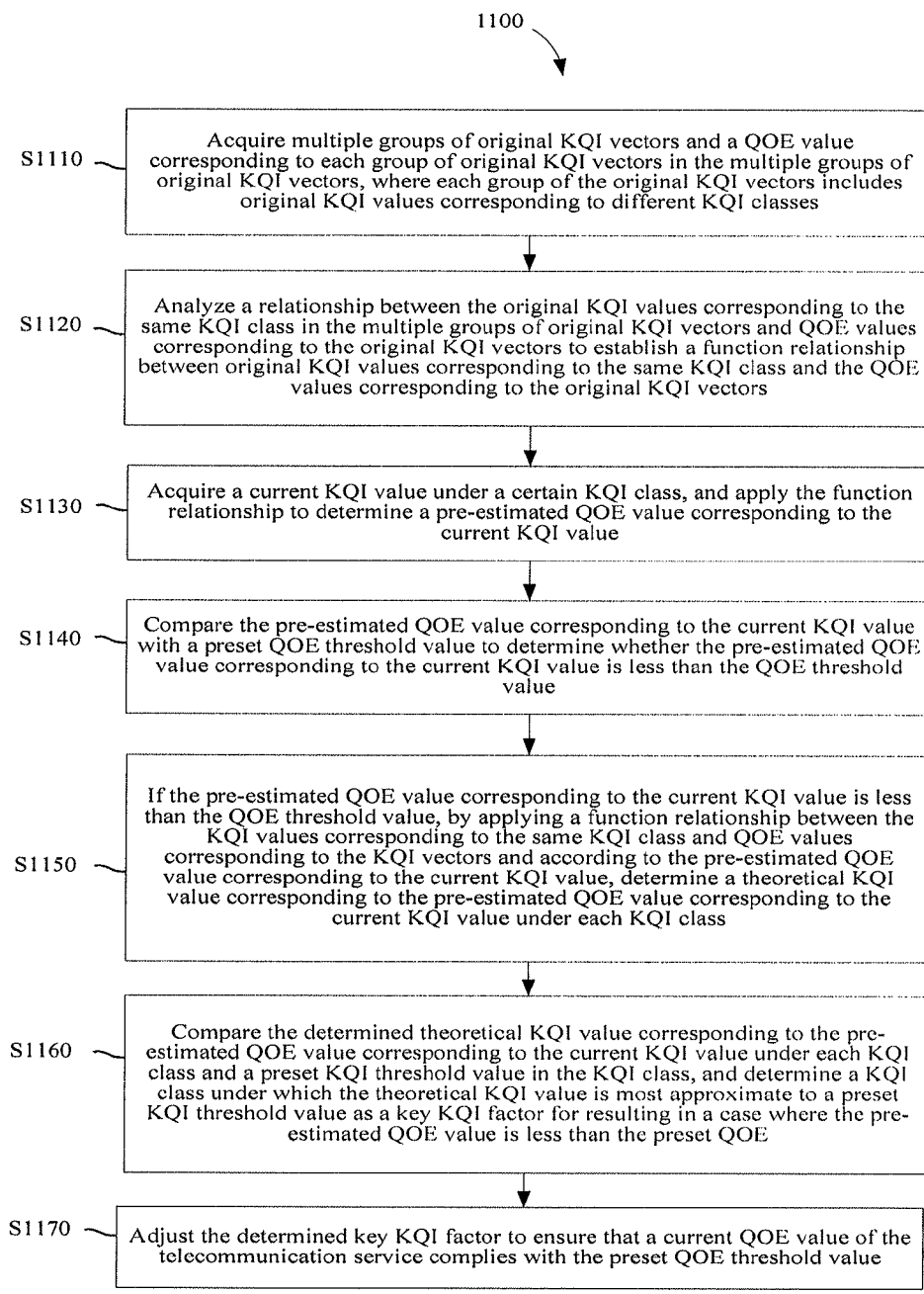
FIG. 11 is a block diagram of another method for ensuring QOE of a telecommunication service according to an embodiment of the present invention.

As shown in FIG. 11, the present invention further provides a method 1100 for ensuring QOE of a telecommunication service, including:

S1110: Acquire multiple groups of original KQI vectors and a QOE value corresponding to each group of original KQI vectors in the multiple groups of original KQI vectors, where each group of original KQI vectors includes original KQI values corresponding to different KQI classes.

S1120: Analyze a relationship between the original KQI values corresponding to the same KQI class in the multiple groups of original KQI vectors and the QOE values corresponding to the original KQI vectors to establish a function relationship between original KQI values corresponding to the same KQI class and the QOE values corresponding to the original KQI vectors.

The step S1110 and the step S1120 are the same as the step S810 and step S820 in the method for ensuring QOE of a telecommunication service described above. For the specific implementation manner and details, reference can be made to the content described in the steps S810 and S820.

S1130: Acquire a current KQI value under a certain KQI class, and apply the function relationship to determine a pre-estimated QOE value corresponding to the current KQI value.

According to the function relationship between the original KQI values corresponding to the same KQI class and QOE values corresponding to the original KQI vectors acquired in step S1120, the pre-estimated QOE value corresponding to the current KQI value is calculated, and the calculated pre-estimated QOE value is used to determine the KQI class that affects a QOE value.

S1140: Compare the pre-estimated QOE value corresponding to the current KQI value with a preset QOE threshold value to determine whether the pre-estimated QOE value corresponding to the current KQI value is less than the QOE threshold value.

S1150: If the pre-estimated QOE value corresponding to the current KQI value is less than the QOE threshold value, by applying a function relationship between the KQI values corresponding to the same KQI class and the QOE values corresponding to the KQI vectors and according to the pre-estimated QOE value corresponding to the current KQI value, determine a theoretical KQI value corresponding to the pre-estimated QOE value corresponding to the current KQI value under each KQI class.

S1160: Compare the determined theoretical KQI value corresponding to the pre-estimated QOE value corresponding to the current KQI value under each KQI class and a preset KQI threshold value in the KQI class, and determine a KQI class under which the theoretical KQI value is most approximate to the preset KQI threshold value as a key KQI factor for resulting in a case where the pre-estimated QOE value is less than the preset QOE threshold value.

S1170: Adjust the determined key KQI factor to ensure that a current QOE value of the telecommunication service complies with the preset QOE threshold value.

With the method for ensuring QOE of the telecommunication service provided in this embodiment of the present invention, by pre-establishing a function relationship between KQI values under a certain KQI class and the QOE values corresponding to the KQI vectors where the KQI values are located and according to a current KQI value, a QOE value can be estimated, that is, the QOE value is pre-estimated, a theoretical KQI value is calculated according to the pre-estimated QOE value, and a key KQI class, that is, a key KQI factor, that affects the QOE is determined according to a relationship between the theoretical KQI value and a preset KQI threshold value, so that the KQI factor is adjusted if necessary to change a QOE value, thereby meeting customer requirements.

Figure 12:
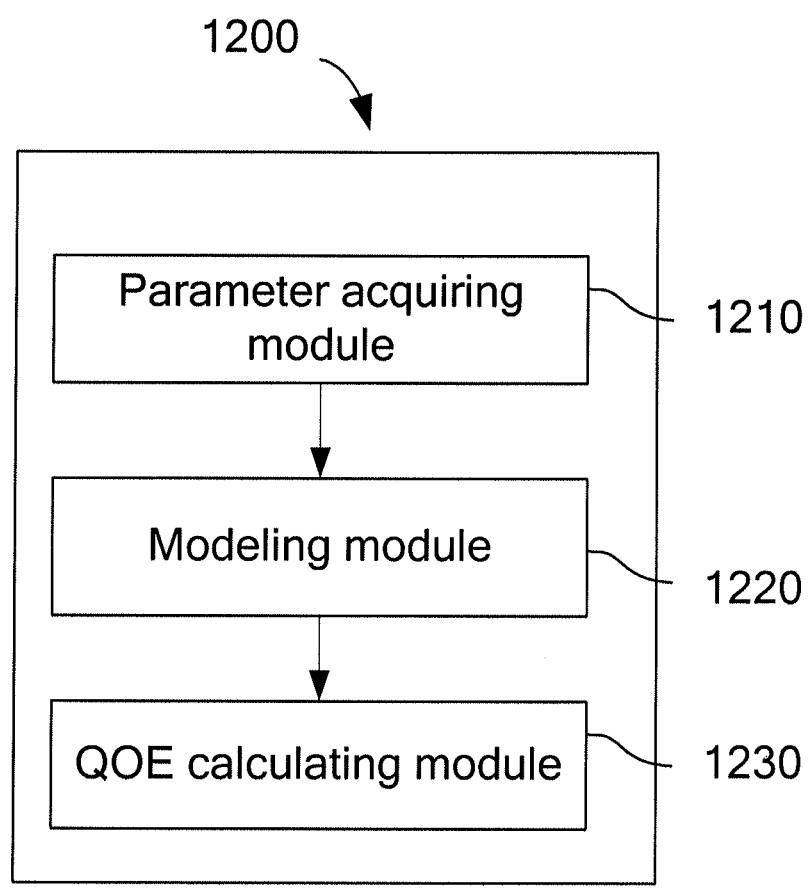
FIG. 12 is a block diagram of an apparatus for acquiring quality of experience of a telecommunication service according to an embodiment of the present invention.

As shown in FIG. 12, an embodiment of the present invention further provides an apparatus 1200 for acquiring QOE of a telecommunication service. The apparatus 1200 for acquiring QOE of a telecommunication service is configured to implement the method for acquiring QOE of a telecommunication service. The apparatus 1200 for acquiring QOE of a telecommunication service specifically includes:

a parameter acquiring module 1210, configured to acquire multiple groups of original KQI vectors and a QOE value corresponding to each group of original KQI vectors in the multiple groups of original KQI vectors;

The indicator of quality of service of the QOE value is a key performance index (Key Performance Index, KPI) of a network element, and it can be monitored by a KQI monitoring apparatus. In this embodiment of the present invention, the KQI monitoring apparatus performs user-level monitoring for KQIs of multiple users at the same time, that is, monitors KQIs of each user. The KQI monitoring result of each user is represented by the KQI vectors that are constituted by multiple KQI values of different classes or properties. The KQI vectors obtained through the direct monitoring performed by the KQI monitoring apparatus is called an original KQI vector. The original KQI vector usually includes multiple composition elements or factors, that is, KQI values of different classes or properties. For example, the KQI vector of a voice service may include caller connection success rate, caller access duration, call drop rate, and voice quality; the KQI vector of a web browsing service may include access success rate, access duration, refresh success rate, refresh duration, drop rate, and average downloading speed; the KQI vector of a short messaging service (Short Messaging Service, SMS) may include sending delay and sending success rate. It is understandable that, according to features of different telecommunication services, the KQI vector can be customized.

Figure 13:
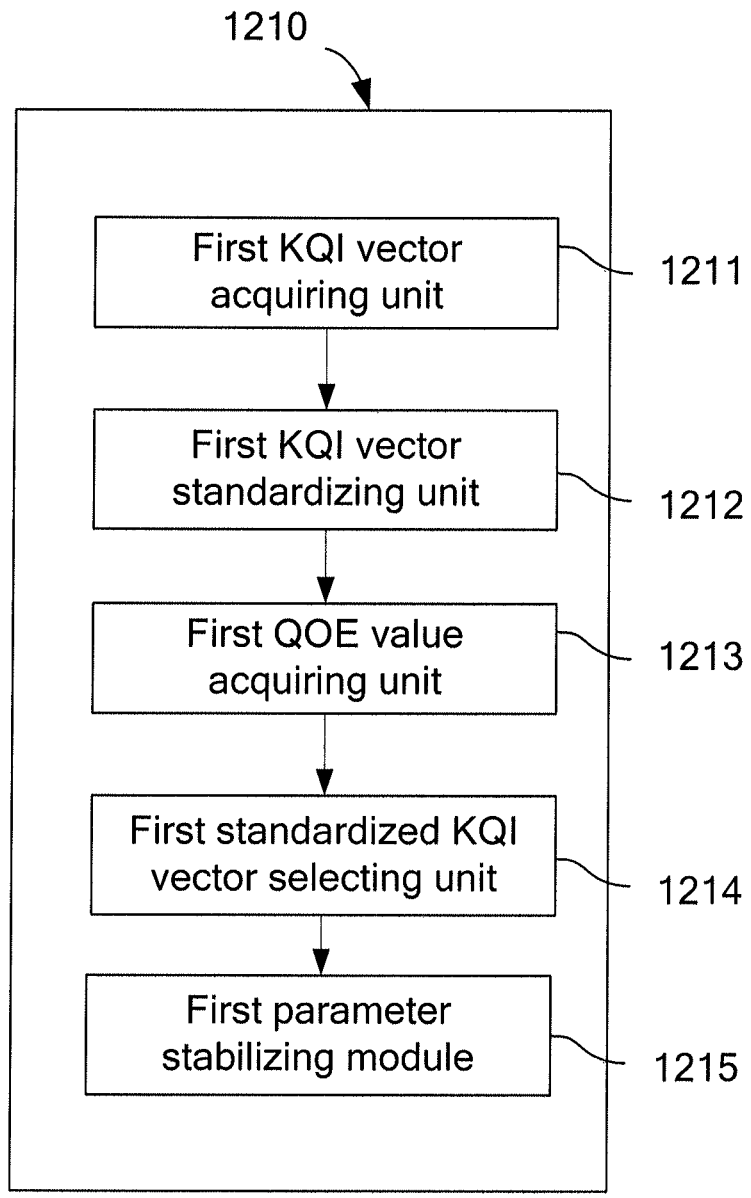
FIG. 13 is a block diagram of a parameter acquiring module of the apparatus for acquiring quality of experience of the telecommunication service in FIG. 12.

After the original KQI vectors are acquired, corresponding QOE values need to be acquired according to the acquired original KQI vectors. Specifically, as shown in FIG. 13, the parameter acquiring module 1210 further includes:

a first KQI vector acquiring unit 1211, configured to acquire multiple original KQI values of a class of telecommunication service, the multiple original KQI values constituting multiple groups of original KQI vectors;

In order to accurately and objectively obtain the correspondence between original KQI vectors and QOE, proper evaluation samples are required. That is, enough original KQI values need to serve as samples for subsequent analysis. Therefore, multiple KQI values are gathered by acquiring a KQI value for each of multiple users. In addition, the KQI classes or properties corresponding to different services are different. Therefore, multiple KQI values of a certain class, that is, the same class, of telecommunication service, need to be determined and acquired to constitute the original KQI vectors.

a first KQI vector standardizing unit 1212, configured to standardize each group of original KQI vectors in the multiple groups of original KQI vectors to form corresponding multiple groups of standardized KQI vectors, each group of standardized KQI vectors being corresponding to a KPI state.

The same original KQI vector includes original KQI values of multiple different classes or properties, and these multiple original KQI values that are included in the same KQI vector cannot be directly compared with each other. Therefore, in order to have the multiple original KQI values contained in the same KQI vector mutually comparable or capable of comparing with a uniform standard, each group of original KQI vectors in the multiple groups of original KQI vectors need to be standardized. Each group of standardized KQI vectors is corresponding to a KPI state; the KPI state is a space characteristic represented by the standardized KQI vectors in the vector space constituted by the standardized KQI vectors.

Figure 14:
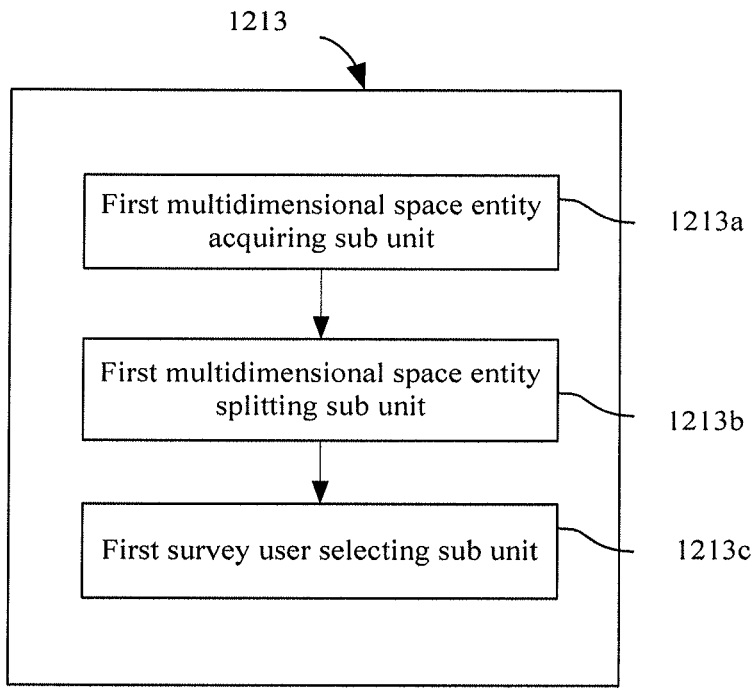
FIG. 14 is a block diagram of a first QOE value acquiring unit of the parameter acquiring module in FIG. 13.

Specifically, the first KQI vector standardizing unit 1212 is configured to:

convert original KQI values in each of the original KQI vectors through formula (a) into standard scores, or z scores, to acquire a standardized KQI vector corresponding to each original KQI vector;

$$z = \frac{x - \bar{x}}{s} \quad (a)$$

where, x is an original KQI value of an original KQI vector, $\bar{x}$ is an average value of multiple original KQI values in the original KQI vector, and s is a standard deviation of multiple original KQI vectors in the original KQI vector; through the preceding method, the original KQI vector is accordingly converted into a standardized KQI vector.

a first QOE value acquiring unit 1213, configured to acquire original QOE values corresponding to the multiple groups of standardized KQI vectors;

After standardized KQI vectors are acquired, users corresponding to the multiple groups of standardized KQI vectors are interviewed and surveyed to acquire the original QOE values corresponding to the multiple groups of standardized KQI vectors. In order that the original QOE values are properly and evenly distributed, as shown in FIG. 14, the first QOE value acquiring unit 1213 specifically includes:

a first multi-dimensional space entity acquiring unit 1213a, configured to select, from the vector space constituted by the standardized KQI vectors, a multi-dimensional space entity that includes all standardized KQI vectors, where each dimension of the multi-dimensional space entity includes a minimum value, a maximum value, and a value between the minimum value and the maximum value that are in the standardized KQI vectors and fall on the dimension;

Each of the standardized KQI vectors constitutes an M-dimensional (multidimensional) vector space according to the number M of standardized KQI values included therein. A multidimensional space entity that includes all the standardized KQI vectors is selected from the multidimensional vector space. It is understandable that, the multidimensional space entity may be an enclosed area in a three-dimensional space, or an enclosed area in a super space, such as a four-dimension space or a five-dimension space. In each of the vector spaces, the acquired multidimensional space entity is capable of covering any one of the standardized KQI vectors in the standardized KQI vector space to ensure that the standard vectors covered by the acquired multidimensional space entity are complete and accurate.

a first multi-dimensional space entity splitting sub unit 1213b, configured to evenly divide the multi-dimensional space entity along each dimension of the multi-dimensional space entity into adjacent space area blocks, and select the same quantity of standardized KQI vectors from each of the space area blocks;

In order to take each distribution case of multiple standardized KQI vectors included in the multidimensional space entity in the multidimensional space entity into account, that is, to acquire corresponding original QOE values, the multi-dimensional space entity is evenly divided through the preceding step along each dimension of the multi-dimensional space entity into multiple adjacent space area blocks, and the same quantity of standardized KQI vectors are selected from each of the space area blocks to serve as survey objects.

a first survey user selecting sub unit 1213c, configured to acquire original QOE values corresponding to the standardized KQI vectors selected from each of the space area blocks;

As standardized KQI values are not evenly distributed, a requirement on a full view of a relationship between KQIs and QOE values can be relatively accurately reflected by selecting the standardized KQI vectors and surveying users corresponding to the selected standardized KQI vectors, and survey resources can be saved.

The parameter acquiring module 1210 further includes:

a first standardized KQI vector selecting unit 1214, configured to select the standardized KQI vectors whose KPI states are approximate to form sample standardized KQI vectors;

As user scores, that is, QOE values (MoS scores), are random, in order to obtain a QOE value for a voice clip, this voice clip needs to be evaluated for multiple times to acquire the QOE value. The QOE values acquired in the multiple times of evaluation are averaged to acquire an average QOE value, and then the relatively stable correspondence between a QOE value and KQI can be acquired only. However, in live network environment, it is almost impossible that the same KPI state occurs for multiple times. Therefore, it needs to find an approximate KPI state to replace a repeated KPI state to form a sample standardized KQI vector.

Figure 15:
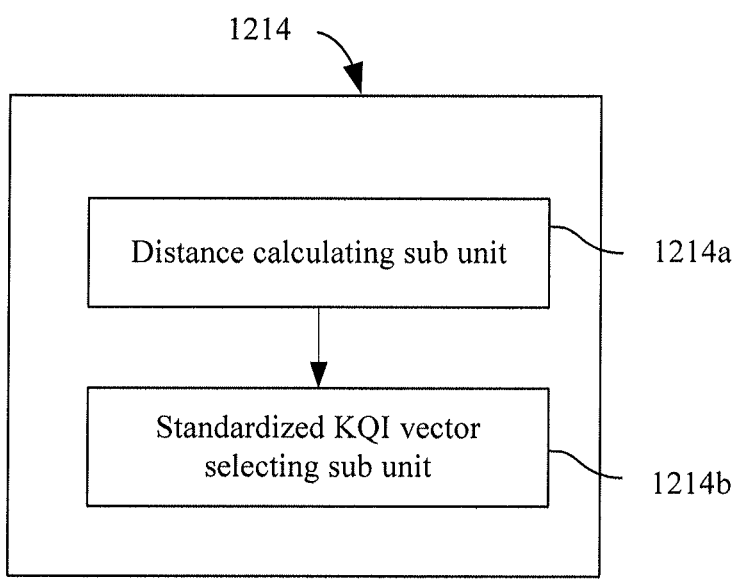
FIG. 15 is a block diagram of a first standardized KQI vector selecting unit of the parameter acquiring module in FIG. 13.

Specifically, corresponding to the acquiring the original QOE values corresponding to the multiple groups of standardized KQI vectors through the disclosed first multidimensional space entity acquiring sub unit 1410, first multidimensional space entity splitting sub unit 1420, and first survey user selecting sub unit 1430, as shown in FIG. 15, the first standardized KQI vector selecting unit 1214 specifically includes:

a distance calculating sub unit 1214a, configured to calculate distances between the standardized KQI vectors selected from each of the space area blocks;

The distances between the standardized vectors may be calculated by using a Euclidean distance formula $\sqrt{(x_1-x_2)^2+(y_1-y_2)^2+...}$, where x and y represent KQI values of different KQI classes in the standardized KQI vectors. It is understandable that the calculation of the distances between the standardized KQI vectors is not confined to the calculation performed according to the Euclidean distance formula. Other formulas for calculating vector space distances may also be used.

a standardized KQI vector selecting sub unit 1214b, configured to: according to the calculated distances, select, for each of the selected standardized KQI vectors, multiple standardized KQI vectors that have shortest distances from the standardized KQI vector as the standardized KQI vectors whose KPI states are approximate to form the sample standardized KQI vectors.

Specifically, L (for example, 30 or greater than 30) standardized KQI vectors may be selected for each of the standardized KQI vectors, where L standardized KQI vectors are adjacent to it. The selection method is to start selecting a standardized KQI vector with the smallest distance from the standardized KQI vector, and count the number until the count reaches L. The count value L is merely selected at random to describe the technical solution of the present invention. The number of selected KQI vectors is not confined by the preceding count value.

Figure 16:
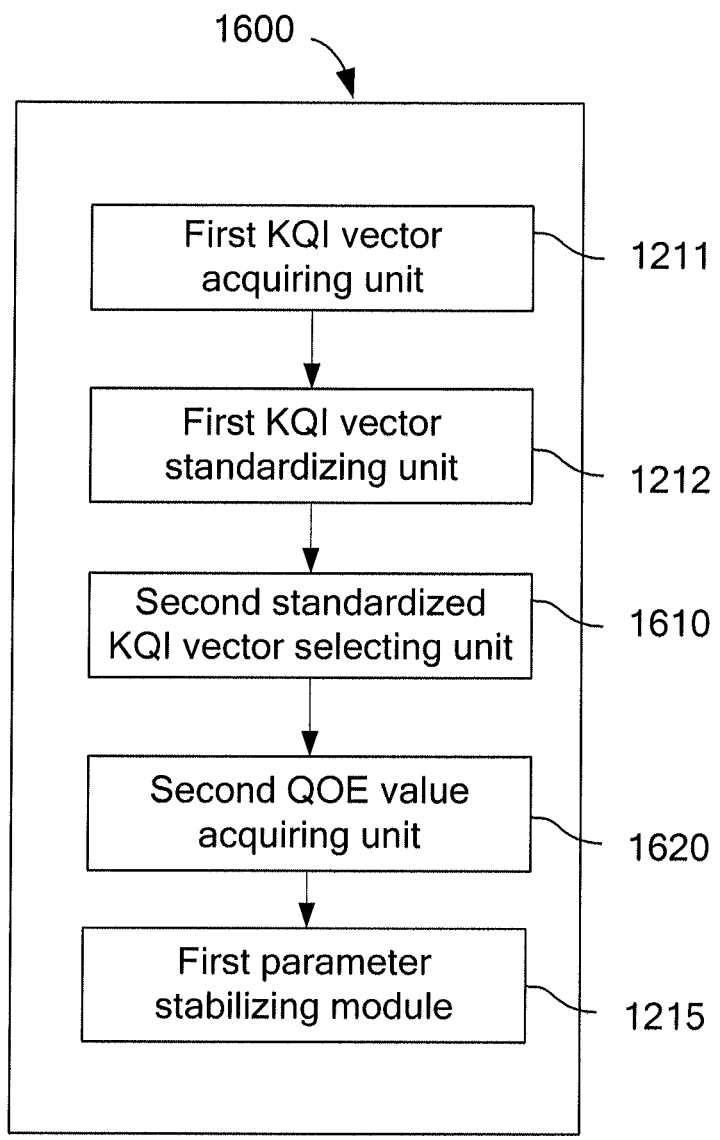
FIG. 16 is a block diagram of another parameter acquiring module of the apparatus for acquiring quality of experience of the telecommunication service in FIG. 12.

The parameter acquiring module 1210 further includes:

a first parameter stabilizing module 1215, configured to stabilize a relationship between original KQI vectors corresponding to the sample standardized KQI vectors and original QOE values corresponding to the sample standardized KQI vectors to obtain stable original KQI vectors and stable QOE values;

As described above, as KQI values are not evenly distributed, but are distributed in the mildly good states at most times, in order to obtain the correspondence between stable KQIs and stable QOE values, the sample standardized KQI vectors whose KPI states are approximate and the original QOE values corresponding to the sample standardized KQI vectors need to be stabilized. Specifically, the stabilizing the relationship between the original KQI vectors corresponding to the sample standardized KQI vectors and the original QOE values corresponding to the sample standardized KQI vectors to obtain stable original KQI vectors and stable QOE values is specifically:

As shown in FIG. 16, it is understandable that, another implementation scheme instead of the parameter acquiring module 1210 is another parameter acquiring module 1600. The parameter acquiring module 1600 in this implementation scheme specifically includes:

the first KQI vector acquiring unit 1211, configured to acquire multiple original KQI values of a class of telecommunication service, the multiple original KQI values constituting multiple groups of original KQI vectors;

the first KQI vector standardizing unit 1212, configured to standardize each group of original KQI vectors in the multiple groups of original KQI vectors to form corresponding multiple groups of standardized KQI vectors, each group of standardized KQI vectors being corresponding to a KPI state; and a second standardized KQI vector selecting unit 1610, configured to select the standardized KQI vectors whose KPI states are evenly distributed.

As user scores, that is, QOE values (MoS scores), are random, in order to obtain a QOE value for a voice clip, this voice clip needs to be evaluated for multiple times to acquire the QOE value. The QOE values acquired in the multiple times of evaluation are averaged to acquire an average QOE value, and then the relatively stable correspondence between a QOE value and KQI can be acquired only. However, in live network environment, it is almost impossible that the same KPI state occurs for multiple times, and distribution of KPI states in the live network environment basically is approximate to normal distribution. That is, KPI states may basically be distributed in a certain state region, and KQIs in this region basically follow the pattern of even distribution. Therefore, after the standardized KQI vectors whose KPI states are evenly distributed and the QOE values corresponding to the standardized KQI vectors are selected, an actual relationship between KQI and the QOE can be reflected.

Figure 17:
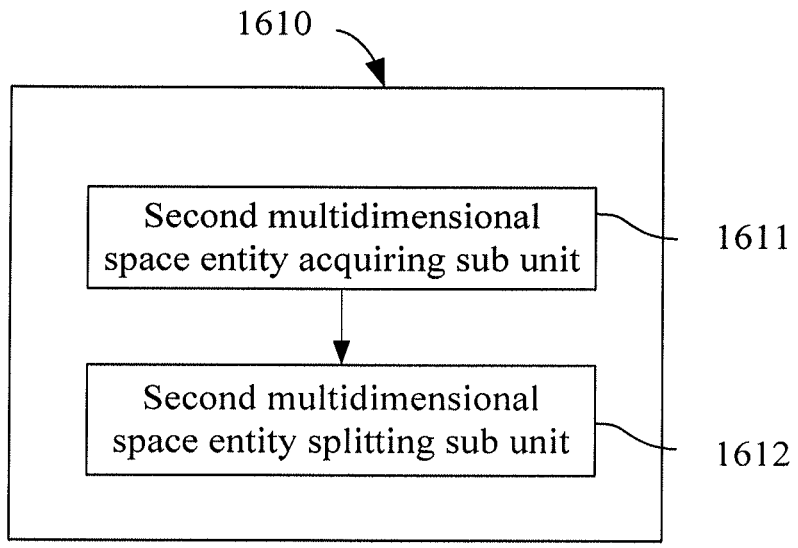
FIG. 17 is a block diagram of a second standardized KQI vector selecting unit of the another parameter acquiring module in FIG. 16.

Specifically, as shown in FIG. 17, the second standardized KQI vector selecting unit 1610 specifically includes:

a second multi-dimensional space entity acquiring unit 1611, configured to select, from the vector space constituted by the standardized KQI vectors, a multi-dimensional space entity that includes all standardized KQI vectors, where each dimension of the multi-dimensional space entity includes a minimum value, a maximum value, and a value between the minimum value and the maximum value that are in the standardized KQI vectors and fall on the dimension;

Each of the standardized KQI vectors constitutes an M-dimensional (multidimensional) vector space according to the number M of standardized KQI values included therein. A multidimensional space entity that includes all KQI vectors is selected from the multidimensional vector space. It is understandable that, the multidimensional space entity may be an enclosed area in a three-dimensional space, or an enclosed area in a super space, such as a four-dimension space or five-dimension space. In each of the vector spaces, the acquired multidimensional space entity is capable of covering any one of the standardized KQI vectors in the standardized KQI vector space to ensure that the standard vectors covered by the acquired multidimensional space entity are complete and accurate.

a second multi-dimensional space entity splitting sub unit 1612, configured to evenly divide the multi-dimensional space entity along each dimension of the multi-dimensional space entity into adjacent space area blocks, select at random, from each of the space area blocks that includes not less than the preset number N of standardized KQI vectors, N standardized KQI vectors, and use the selected N standardized KQI vectors as the standardized KQI vectors whose KPI states are evenly distributed, to form the sample standardized KQI vectors.

The KPI states are basically distributed in a certain state area in a centralized manner, and the KQIs in this area basically follow the pattern of even distribution. Therefore, after the standardized KQI vectors whose KPI states are evenly distributed and the QOE values corresponding to the standardized KQI vectors are selected, an actual relationship between KQI and the QOE can be reflected. After the multi-dimensional space entity that includes all the KQI vectors is evenly divided along each dimension of the multidimensional space entity into adjacent space area blocks, it may be regarded that a space area block that includes the preset number N of standardized KQI vectors falls within the area where the KQI states are distributed in a centralized manner. The preset number N is preferably larger than or equal to 30. Therefore, by selecting at random, from each of the space area blocks that includes not less than the preset number N of standardized KQI vectors, N standardized KQI vectors, and using the selected N standardized KQI vectors as the standardized KQI vectors whose KPI states are evenly distributed, a requirement for selecting samples in the method according to the present invention can be met.

After the standardized KQI vectors whose KPI states are evenly distributed are acquired, the parameter acquiring module 1610 in the another implementation scheme further includes:

a second QOE value acquiring unit 1620, configured to acquire original QOE values corresponding to the sample standardized KQI vectors, where as KQI values are not evenly distributed, a requirement on a full view of a relationship between KQIs and QOE values can be relatively accurately reflected by selecting the standardized KQI vectors and surveying users corresponding to the selected standardized KQI vectors, and survey resources can be saved;

and the first parameter stabilizing unit 1215, configured to stabilize a relationship between original KQI vectors corresponding to the sample standardized KQI vectors and original QOE values corresponding to the sample standardized KQI vectors to obtain stable original KQI vectors and stable QOE values.

After the parameter acquiring module 1210 is configured to acquire the multiple groups of original KQI vectors and the QOE value corresponding to each group of original KQI vectors in the multiple groups of original KQI vectors, the apparatus 1200 for acquiring quality of experience of a telecommunication service provided in this embodiment of the present invention further includes:

a modeling module 1220, configured to analyze a relationship between the multiple groups of original KQI vectors and QOE values corresponding to the multiple groups of original KQI vectors to establish a function relationship between KQI vectors and QOE values corresponding to the KQI vectors;

After the original KQI vectors and corresponding original QOE values are acquired, the correspondence or mapping between the KQI vectors and corresponding QOE values may be acquired through a modeling method. According to the correspondence or mapping, corresponding QOE values can be objectively predicted or acquired by acquiring KQIs in subsequent use.

Further, the analyzing, by the modeling module 1220, the relationship between the multiple groups of original KQI vectors and QOE values corresponding to the multiple groups of original KQI vectors to establish the function relationship between the KQI vectors and the QOE values corresponding to the KQI vectors specifically includes:

analyzing a relationship between the stable original KQI vectors and the stable QOE values and using a multiple regression modeling method to establish a function relationship between the KQI vectors and the QOE values corresponding to the KQI vectors.

Further, the analyzing, by the modeling module 1220, the relationship between the stable original KQI vectors and the stable QOE values and using the multiple regression modeling method to establish the function relationship between the KQI vectors and the QOE values corresponding to the KQI vectors specifically includes:

with a stable original KQI vector as an independent variable, and with a stable QOE value as a dependent variable, obtaining a function relationship between the stable QOE values and the stable original KQI vectors through multiple regression analysis, where the function relationship may be expressed as follows:

QOE calculation value=f(KQI1, KQI2, KQI3, . . . ), where f is a function of the QOE calculation value;

and performing conversion for the obtained function relationship between the stable QOE values and the stable original KQI vectors to acquire a function relationship between the KQI vectors and the QOE values corresponding to the KQI vectors, so that the QOE values calculated according to the acquired function relationship between the KQI vectors and the QOE values corresponding to the KQI vectors are confined within a preset value range.

It is understandable that the preset value range of the QOE values is set according to requirements of surveyors. It is generally from 1 to 5, but may also be set to different value ranges, such as from 1 to 3 and from 1 to 7 according to requirements. The present invention does not make the specific restriction for the QOE values.

The conversion method may be as follows:

Perform tangent conversion and arc tangent conversion in sequence:

$$QOE \text{ value} = \frac{4}{\pi} * \tan^{-1} * \tan\left(\frac{\pi*(f-3)}{4}*\delta\right) + 3$$

where, $0.9 < \delta < 1$, and f is a formula obtained through the multiple regression analysis.

Alternatively, the conversion method may also be converting the function relationship into a piecewise function:

$$QOE \text{ value} = \begin{cases} 1 & (QOE \text{ calculation value} <= 1) \\ f & (1 < QOE \text{ calculation value} < 5) \\ 5 & (QOE \text{ calculation value} >= 5) \end{cases}$$

The meaning of the above piecewise function is as follows: when the QOE calculation value is smaller than or equal to 1, the QOE value is 1; when the QOE calculation value is larger than 1 and smaller than 5, the QOE value is f; when the QOE calculation value is larger than 5, the QOE value is 5.

After the function relationship between the QOE values and the KQIs is established through the above method, the apparatus for acquiring QOE of the telecommunication service in the present invention further includes:

a QOE calculating module 1230, configured to acquire a current KQI vector, and apply the function relationship between the KQI vectors and the QOE values corresponding to the KQI vectors to obtain a current QOE value corresponding to the current KQI vector.

According to the correspondence between the KQIs and the corresponding QOE values established by the modeling module 1220, a QOE value corresponding to the current KQI can be acquired, so that the QOE of the telecommunication service is objectively and quickly acquired, the long-term repetitive interview required in traditional QOE evaluation is avoided, thereby helping a carrier directly manage user perception and ensure it, and improving customer satisfaction.

Figure 18:
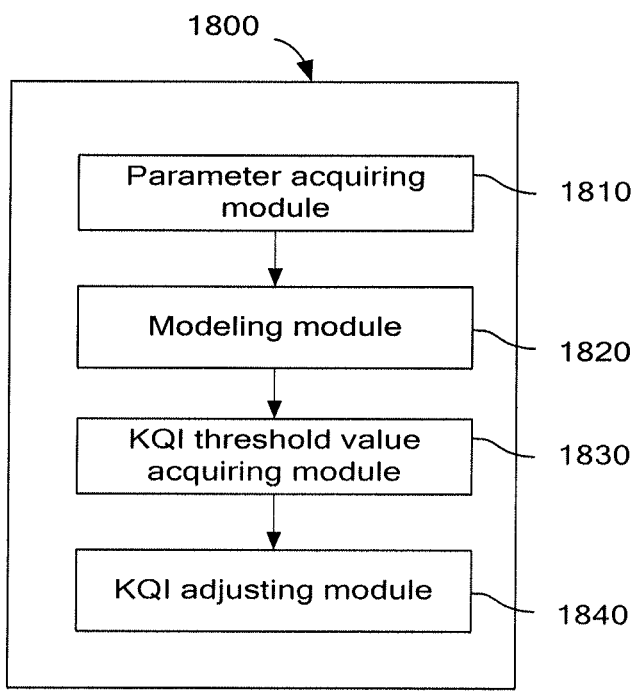
FIG. 18 is a block diagram of an apparatus for ensuring QOE of a telecommunication service according to an embodiment of the present invention.

As shown in FIG. 18, the present invention further provides an apparatus 1800 for ensuring QOE of a telecommunication service. The apparatus 1800 for ensuring QOE of the telecommunication service is configured to implement the method for ensuring QOE of the telecommunication service. The apparatus 1800 for ensuring QOE of the telecommunication service specifically includes:

a parameter acquiring module 1810, configured to acquire multiple groups of original KQI vectors and a QOE value corresponding to each group of original KQI vectors in the multiple groups of original KQI vectors, where each group of original KQI vectors includes original KQI values corresponding to different KQI classes.

In this step, the parameter acquiring module 1810 may be implemented by using a method similar to the parameter acquiring module 1210 in the apparatus 1200 for acquiring QOE of a telecommunication service.

Figure 19:
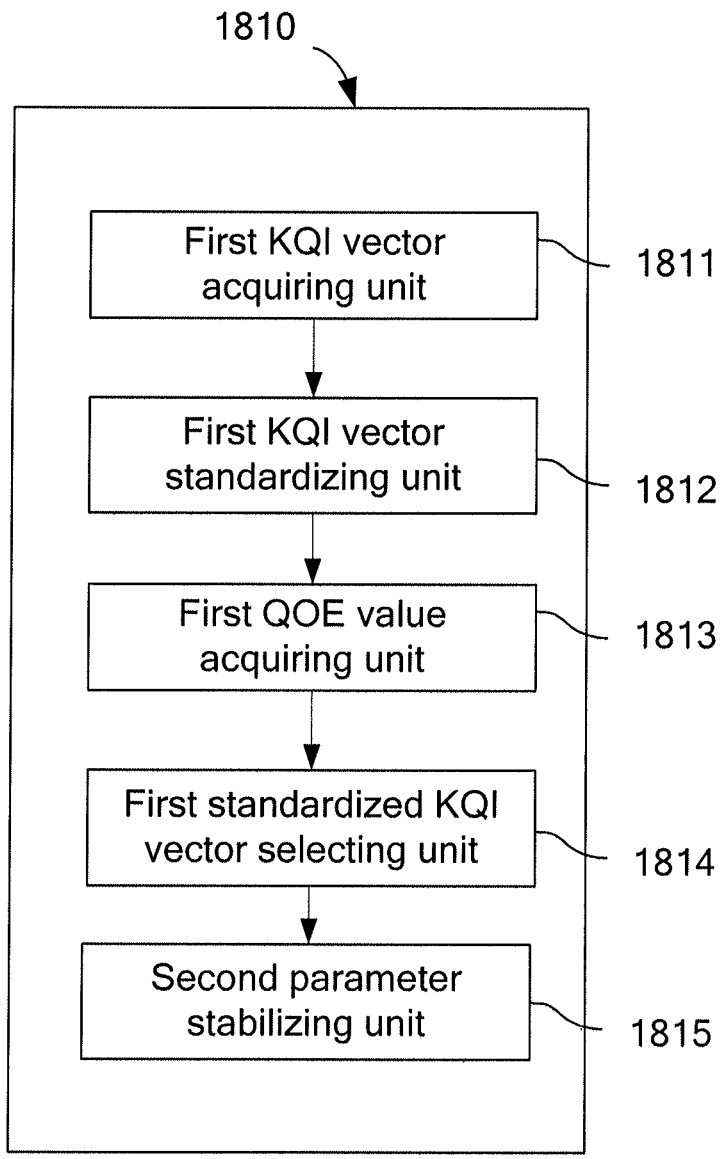
FIG. 19 is a block diagram of a parameter acquiring module of the apparatus for acquiring quality of experience of the telecommunication service in FIG. 18.

Specifically, as shown in FIG. 19, the parameter acquiring module 1810 may include:

a first KQI vector acquiring unit 1811, configured to acquire multiple original KQI values of a class of telecommunication service, the multiple original KQI values constituting multiple groups of original KQI vectors;

a first KQI vector standardizing unit 1812, configured to standardize each group of original KQI vectors in the multiple groups of original KQI vectors to form corresponding multiple groups of standardized KQI vectors, each group of standardized KQI vectors being corresponding to a KPI state;

a first QOE value acquiring unit 1813, configured to acquire original QOE values corresponding to the multiple groups of standardized KQI vectors;

a first standardized KQI vector selecting unit 1814, configured to select the standardized KQI vectors whose KPI states are approximate to form sample standardized KQI vectors;

where the first KQI vector acquiring unit 1812 has the same implementation manner as the first KQI vector acquiring unit 1211, and includes the same sub units; the first KQI vector standardizing unit 1812 has the same implementation manner as the first KQI vector standardizing unit 1212, and includes the same sub units; the first QOE value acquiring unit 1813 has the same implementation manner as the first QOE value acquiring unit 1213, and includes the same sub units; the first standardized KQI vector selecting unit 1814 has the same implementation manner as the first standardized KQI vector selecting unit 1214, and includes the same sub units; and for details, reference can be made to the descriptions in the corresponding parts described above, and details are not described herein again;

and a second parameter stabilizing unit 1815, configured to stabilize a relationship between the original KQI values corresponding to the same KQI class in the sample standardized KQI vectors and original QOE values corresponding to the sample standardized KQI vectors to obtain stable original KQI values and stable QOE values.

Stabilizing, by the second parameter stabilizing unit 1815, the relationship between the original KQI values corresponding to the same KQI class in the sample standardized KQI vectors and the original QOE values corresponding to the sample standardized KQI vectors to obtain stable original KQI values and stable QOE values may specifically be:

sorting multiple original KQI values corresponding to multiple standardized KQI values corresponding to the same KQI class in the sample standardized KQI vectors to form an original KQI value sequence, and dividing the original KQI value sequence evenly into original KQI value sequence segments; and calculating the average value or probability distribution of original KQI values in each of the original KQI value sequence segments as a stable original KQI value, and calculating the average value or probability distribution of QOE values corresponding to the sample standardized KQI vectors where standard KQI values corresponding to original KQI values in each of the original KQI value sequence segments are located as a stable QOE values; or using the same QOE value corresponding to the sample standardized KQI vectors as a stable QOE value; and calculating the average value or probability distribution of original KQI values corresponding to multiple standardized KQI values corresponding to the same KQI class in the sample standardized KQI vectors that have the stable QOE values as a stable original KQI value.

Figure 20:
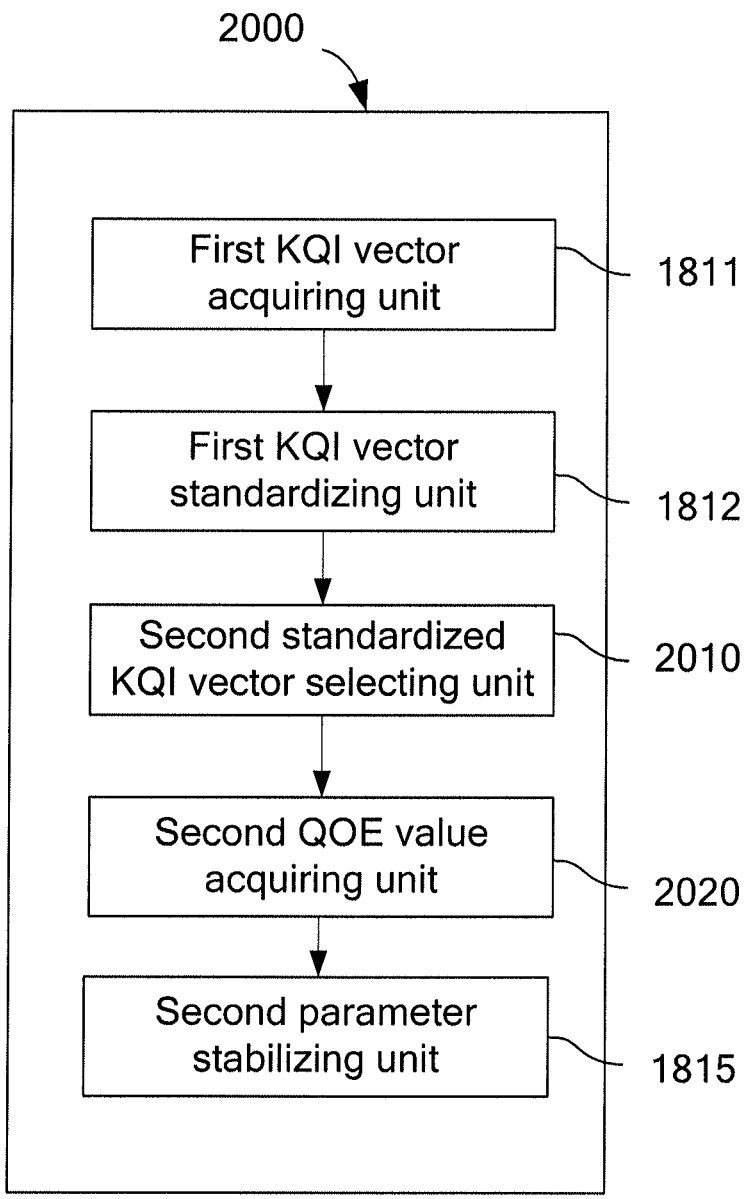
FIG. 20 is a block diagram of another parameter acquiring module of the apparatus for acquiring quality of experience of the telecommunication service in FIG. 18.

As shown in FIG. 20, alternatively, the parameter acquiring module 1810 may be replaced by a parameter module 2000. The parameter module 1900 specifically includes:

the first KQI vector acquiring unit 1811, configured to acquire multiple original KQI values of a class of telecommunication service, the multiple original KQI values constituting multiple groups of original KQI vectors;

the first KQI vector standardizing unit 1812, configured to standardize each group of original KQI vectors in the multiple groups of original KQI vectors to form corresponding multiple groups of standardized KQI vectors, each group of standardized KQI vectors being corresponding to a KPI state;

a second standardized KQI vector selecting unit 2010, configured to select the standardized KQI vectors whose KPI states are evenly distributed, to form sample standardized KQI vectors, where the second standardized KQI vector selecting unit 2010 is the same as the second standardized KQI vector selecting unit 1610, and includes the same sub units, so details are not described herein again;

a second QOE value acquiring unit 2020, configured to acquire original QOE values corresponding to the sample standardized KQI vectors; and the second parameter stabilizing unit 1815, configured to stabilize a relationship between original KQI values corresponding to the same KQI class in the sample standardized KQI vectors and original QOE values corresponding to the sample standardized KQI vectors to obtain stable original KQI values and stable QOE values.

After the multiple groups of original KQI vectors and the QOE value corresponding to each group of original KQI vectors in the multiple groups of original KQI vectors are acquired through the parameter acquiring module 1810 or parameter module 2000, the apparatus 1800 for ensuring QOE of the telecommunication service further includes:

a modeling module 1820, configured to analyze a relationship between the original KQI values corresponding to the same KQI class in the multiple groups of original KQI vectors and the QOE values corresponding to the original KQI vectors to establish a function relationship between the original KQI values corresponding to the same KQI class and the QOE values corresponding to the original KQI vectors.

Specifically, corresponding to the stable original KQI values and stable QOE values acquired by the parameter acquiring module 1810, the analyzing, (implementing) by the modeling module 1820, the relationship between the original KQI values corresponding to the same KQI class in the multiple groups of original KQI vectors and the QOE values corresponding to the original KQI vectors to establish the function relationship between, the original KQI values corresponding to the same KQI class and the QOE values corresponding to the original KQI vectors specifically includes:

analyzing a relationship between the stable original KQI values corresponding to the same KQI class and the stable QOE values corresponding to the stable original KQI values corresponding to the same KQI class to establish the function relationship.

To be more specific, the analyzing the relationship between the stable original KQI values and the stable QOE values to establish the function relationship specifically includes:

analyzing a relationship between the stable original KQI values and the stable QOE values and using a single regression modeling method to establish a function relationship between the original KQI values corresponding to the same KQI class and QOE values corresponding to the original KQI vectors. The using the single regression modeling method to establish the function relationship between the original KQI values corresponding to the same KQI class and QOE values corresponding to the original KQI vectors specifically includes: with a stable QOE value as an independent variable, and with a stable original KQI value as a dependent variable, obtaining the function relationship through regression analysis. To be specific, if a linear relationship is shown between the stable original KQI value and the stable QOE value, the function relationship is as follows: $KQI = a*QOE + b$;

if a logarithmic relationship is shown between the stable original KQI value and the stable QOE value, the function relationship is as follows: $KQI = a*\ln(QOE) + b$;

if an exponential relationship is shown between the stable original KQI value and the stable QOE value, the function relationship is as follows: $KQI = a*e^{QoE} + b$.

After the function relationship between the original KQI values corresponding to the same KQI class and the QOE values corresponding to the original KQI vectors is obtained, the apparatus for ensuring QOE of the telecommunication service further includes:

a KQI threshold value acquiring module 1830, configured to: according to a preset QOE threshold value, apply the function relationship to determine a KQI threshold value corresponding to a certain KQI class, where according to the relationship between KQI and QOE acquired by the modeling module 1820, a KQI vector threshold value corresponding to a certain KQI class can be acquired according to the preset QOE value. In this way, the KQI that affects a QOE value can be found objectively, and adjustment can be made accordingly, so that the adjusted QOE of the telecommunication service can comply with the preset QOE threshold value;

a KQI adjusting module 1840, configured to: according to the KQI threshold value corresponding to the certain KQI class, adjust a current KQI value corresponding to the certain KQI class to ensure that a current QOE value of the telecommunication service complies with the preset QOE threshold value.

With the apparatus for ensuring QOE of a telecommunication service provided in this embodiment of the present invention, by pre-establishing a function relationship between KQI values under a certain KQI class and the QOE values corresponding to the KQI vectors where the KQI values are located, and according to a QOE threshold value, a corresponding KQI vector threshold value can be acquired, and then the KQI vector threshold value is used as reference to adjust each KQI value in the telecommunication service, so that the QOE can meet customer requirements, thereby improving customer satisfaction.

Figure 21:
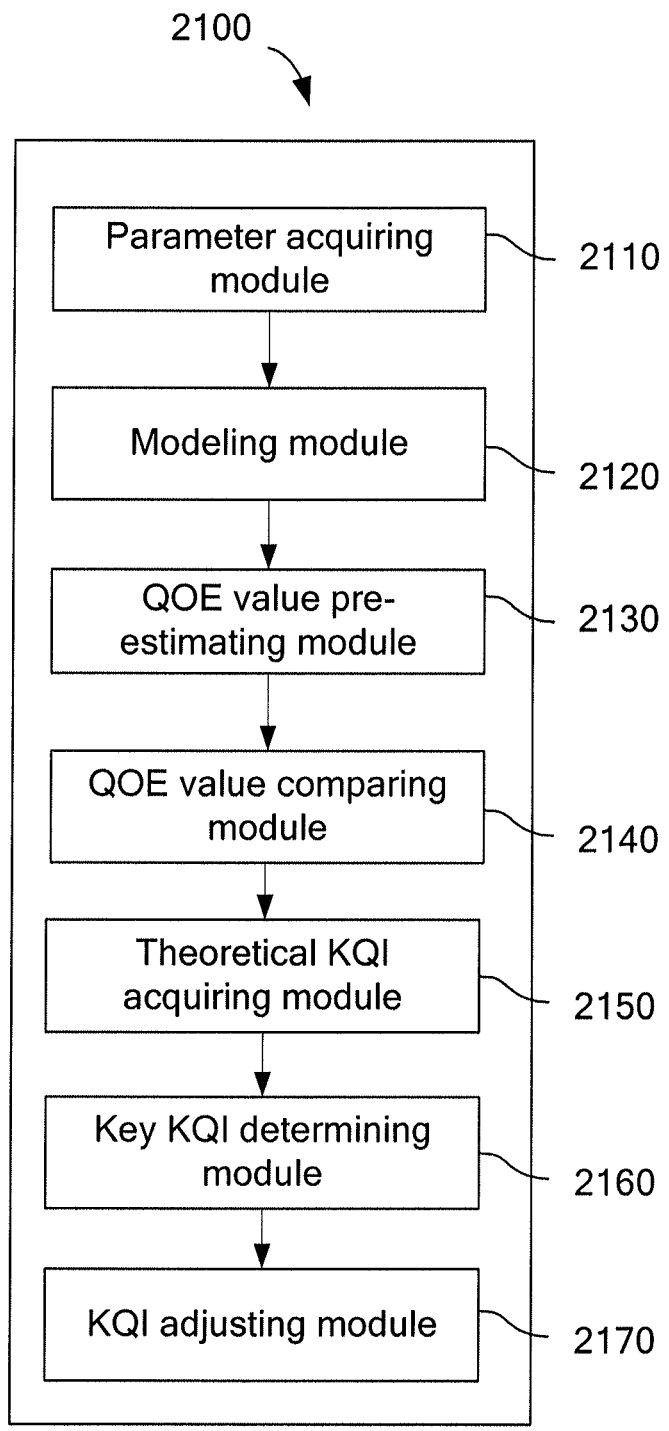
FIG. 21 shows another apparatus for ensuring QOE of a telecommunication service according to an embodiment of the present invention.

As shown in FIG. 21, the present invention further provides an apparatus for ensuring QOE of a telecommunication service, including:

a parameter acquiring module 2110, configured to acquire multiple groups of original KQI vectors and a QOE value corresponding to each group of original KQI vectors in the multiple groups of original KQI vectors, where each group of original KQI vectors includes original KQI values corresponding to different KQI classes;

a modeling module 2120, configured to analyze a relationship between the original KQI values corresponding to the same KQI class in the multiple groups of original KQI vectors and the QOE values corresponding to the original KQI vectors to establish a function relationship between original KQI values corresponding to the same KQI class and the QOE values corresponding to the original KQI vectors;

where the parameter acquiring module 2110 and the modeling module 2120 are the same as the parameter acquiring module 1810 and the modeling module 1820, and for the specific implementation manners and details, reference can be made to the descriptions about the parameter acquiring module 1810 and the modeling module 1820;

a QOE value pre-estimating module 2130, configured to acquire a current KQI value under a certain KQI class, and apply the function relationship to determine a pre-estimated QOE value corresponding to the current KQI value;

where according to the function relationship between the original KQI values corresponding to the same KQI class and QOE values corresponding to the original KQI vectors acquired by the modeling module, the pre-estimated QOE value corresponding to the current KQI value is calculated, and the calculated pre-estimated QOE value is used to determine the KQI class that affects a QOE value;

a QOE value comparing module 2140, configured to compare the pre-estimated QOE value corresponding to the current KQI value with a preset QOE threshold value to determine whether the pre-estimated QOE value corresponding to the current KQI value is less than the QOE threshold value;

a theoretical KQI acquiring module 2150, configured to: if the pre-estimated QOE value corresponding to the current KQI value is less than the QOE threshold value, determine a theoretical KQI value corresponding to the pre-estimated QOE value corresponding to the current KQI value under each KQI class by applying a function relationship between the KQI values corresponding to the same KQI class and the QOE values corresponding to the KQI vectors and according to the pre-estimated QOE value corresponding to the current KQI value;

a key KQI determining module 2160, configured to compare the determined theoretical KQI value corresponding to the pre-estimated QOE value corresponding to the current KQI value under each KQI class and a preset KQI threshold value in the KQI class, and determine a KQI class under which the theoretical KQI value is most approximate to the preset KQI threshold value as a key KQI factor for resulting in a case where the pre-estimated QOE value is less than the preset QOE threshold value; and a KQI adjusting module 2170, configured to adjust the determined key KQI factor to ensure that a current QOE value of the telecommunication service complies with the preset QOE threshold value.

With the apparatus for ensuring QOE of the telecommunication service provided in this embodiment of the present invention, by pre-establishing a function relationship between KQI values under a certain KQI class and the QOE values corresponding to the KQI vectors where the KQI values are located and according to a current KQI value, a QOE value can be estimated, that is, the QOE value is pre-estimated, a theoretical KQI value is calculated according to the pre-estimated QOE value, and a key KQI class, that is, a key KQI factor, that affects the QOE is determined according to a relationship between the theoretical KQI value and a preset KQI threshold value, so that the KQI factor is adjusted if necessary to change a QOE value, thereby meeting customer requirements.

The above descriptions are merely about exemplary embodiments of the present invention, but are not intended to confine the present invention. Any modifications, equivalent replacements, and improvements made without departing from the idea and principle of the invention shall fall within the protection scope of the embodiments of the present invention.

What is claimed is:

1. A method for acquiring a current quality of experience (QOE) value of a telecommunication service, comprising a network apparatus monitoring a plurality of network elements respectively providing the telecommunication service, wherein the network apparatus comprises at least a processor which is configured to cause the network apparatus to perform functions, comprising:

acquiring multiple groups of original Key Quality Indicator (KQI) vectors and a respective QOE value corresponding to each group of the original KQI vectors in the multiple groups of the original KQI vectors, wherein the multiple groups of original KQI vectors correspond to the plurality of network elements respectively providing the telecommunication service, wherein the acquiring of the multiple groups of the original KQI vectors and the respective QOE value corresponding to each group of the original KQI vectors in the multiple groups of the original KQI vectors, further comprises:

acquiring the multiple original KQI values of a particular class of the telecommunication service, wherein the multiple original KQI values constituting the multiple groups of the original KQI vectors;

standardizing each group of the original KQI vectors in the multiple groups of the original KQI vectors in order to form corresponding multiple groups of standardized KQI vectors, wherein each respective group of the standardized KQI vectors being corresponding to a corresponding Key Performance Index (KPI) state;

analyzing a relationship between the multiple groups of the original KQI vectors and the respective QOE values corresponding to the multiple groups of the original KQI vectors to establish a function relationship between the original KQI vectors which correspond to the plurality of network elements providing the respective telecommunication service, and the respective QOE values corresponding to the original KQI vectors;

acquiring a current KQI vector, and applying the function relationship between the original KQI vectors and the respective QOE values corresponding to the original KQI vectors, in order to obtain the current QOE value which corresponds to a respective network element which provides the telecommunication service corresponding to the current KQI vector; and utilizing the obtained current QOE value to adjust service parameters of the respective network element to improve a respective particular class of telecommunication service, wherein the improving of the respective particular class of telecommunication service, comprises one or more of the following:

yielding higher caller connection success rate and better voice quality in voice service, reducing caller access duration and call drop rate in voice service, yielding higher access success rate, refresh success rate and average downloading speed in web browsing service, reducing refresh duration and drop rate in web browsing service, and yielding higher success rate and reducing delay in a short messaging service (SMS).

2. The method for acquiring the current QOE value of a telecommunication service according to claim 1, wherein, acquiring original QOE values corresponding to the multiple groups of the standardized KQI vectors;

selecting standardized KQI vectors whose KPI states are approximate to form sample standardized KQI vectors; and stabilizing a relationship between the original KQI vectors corresponding to the sample standardized KQI vectors and the original QOE values corresponding to the sample standardized KQI vectors to obtain stable original KQI vectors and stable QOE values;

accordingly, the analyzing the relationship between the multiple groups of original KQI vectors and the respective QOE values corresponding to the multiple groups of the original KQI vectors to establish the function relationship between the KQI vectors and the respective QOE values corresponding to the KQI vectors specifically comprises:

analyzing a relationship between the stable original KQI vectors and the stable QOE values to establish the function relationship.

3. The method for acquiring the current QOE value of a telecommunication service according to claim 2, wherein the acquiring of the original QOE values corresponding to the multiple groups of standardized KQI vectors specifically comprises:

selecting, from a vector space constituted by the standardized KQI vectors, a multi-dimensional space entity that comprises all the standardized KQI vectors, wherein each dimension of the multi-dimensional space entity comprises a minimum value, a maximum value, and a value between the minimum value and the maximum value that are in the standardized KQI vectors and fall on the dimension;

evenly dividing the multi-dimensional space entity along each dimension of the multi-dimensional space entity into adjacent space area blocks, and selecting the same quantity of standardized KQI vectors from each of the space area blocks; and acquiring original QOE values corresponding to the standardized KQI vectors selected from each of the space area blocks;

accordingly, the selecting the standardized KQI vectors whose KPI states are approximate to form the sample standardized KQI vectors specifically comprises:

calculating distances between the standardized KQI vectors selected from each of the space area blocks; and according to the calculated distances, selecting, for each of the selected standardized KQI vectors, multiple standardized KQI vectors that have shortest distances from the standardized KQI vector as the standardized KQI vectors whose KPI states are approximate to form the sample standardized KQI vectors.

4. The method for acquiring the current QOE value of a telecommunication service according to claim 1, wherein the acquiring of the multiple groups of original KQI vectors and the QOE value corresponding to each group of original KQI vectors in the multiple groups of original KQI vectors specifically comprises:

selecting standardized KQI vectors whose KPI states are evenly distributed to form sample standardized KQI vectors;

acquiring original QOE values corresponding to the sample standardized KQI vectors; and stabilizing a relationship between the original KQI vectors corresponding to the sample standardized KQI vectors and the original QOE values corresponding to the sample standardized KQI vectors to obtain stable original KQI vectors and stable QOE values;

accordingly, the analyzing the relationship between the multiple groups of the original KQI vectors and the QOE values corresponding to the multiple groups of the original KQI vectors to establish the function relationship between the KQI vectors and the corresponding QOE values specifically comprises:

analyzing a relationship between the stable original KQI vectors and the stable QOE values to establish the function relationship.

5. The method for acquiring the current QOE value of a telecommunication service according to claim 4, wherein the selecting of the standardized KQI vectors whose KPI states are evenly distributed to form the sample standardized KQI vectors specifically comprises:

selecting, from a vector space constituted by the standardized KQI vectors, a multi-dimensional space entity that comprises all the standardized KQI vectors, wherein each dimension of the multi-dimensional space entity comprises a minimum value, a maximum value, and a value between the minimum value and the maximum value that are in the standardized KQI vectors and fall on the dimension; and evenly dividing the multi-dimensional space entity along each dimension of the multi-dimensional space entity into adjacent space area blocks, selecting at random, from each of the space area blocks that comprises not less than the preset number N of standardized KQI vectors, N standardized KQI vectors, and using the selected N standardized KQI vectors as the standardized KQI vectors whose KPI states are evenly distributed to form the sample standardized KQI vectors.

6. The method for acquiring the current QOE value of a telecommunication service according to claim 2, wherein the stabilizing of the relationship between the original KQI vectors corresponding to the sample standardized KQI vectors and the original QOE values corresponding to the sample standardized KQI vectors to obtain the stable original KQI vectors and stable QOE values specifically comprises: calculating an average value or probability distribution of the original KQI vectors corresponding to the sample standardized KQI vectors as a stable original KQI vector, and calculating an average value or probability distribution of the original QOE values corresponding to the sample standardized KQI vectors as a stable QOE value.

7. The method for acquiring the current QOE value of a telecommunication service according to claim 1, wherein the standardizing of each group of original KQI vectors in the multiple groups of original KQI vectors to form the corresponding multiple groups of standardized KQI vectors specifically comprises:

converting original KQI values in each of the original KQI vectors through formula (a) into standard scores to acquire a standardized KQI vector corresponding to the original KQI vector;

$$z = \frac{x - \bar{x}}{s} \quad (a)$$

wherein x is an original KQI value of an original KQI vector, $\bar{x}$ is an average value of multiple original KQI values in the original KQI vector, and s is a standard deviation of the multiple original KQI vectors in the original KQI vector.

8. The method for acquiring the current QOE value of a telecommunication service according to claim 2, wherein the analyzing of the relationship between the stable original KQI vectors and the stable QOE values to establish the function relationship specifically comprises:

analyzing the relationship between the stable original KQI vectors and the stable QOE values and using a multiple regression modeling method to establish the function relationship between the KQI vectors and the QOE values corresponding to the KQI vectors.

9. The method for acquiring the current QOE value of a telecommunication service according to claim 8, wherein the analyzing of the relationship between the stable original KQI vectors and the stable QOE values and using the multiple regression modeling method to establish the function relationship between the KQI vectors and the QOE values corresponding to the KQI vectors specifically comprises:

with a stable original KQI vector as an independent variable, and with a stable QOE value as a dependent variable, obtaining the function relationship between the stable QOE values and the stable original KQI vectors through multiple regression analysis; and performing conversion for the obtained function relationship between the stable QOE values and the stable original KQI vectors to acquire the function relationship between the KQI vectors and the QOE values corresponding to the KQI vectors, so that a QOE value calculated through the acquired function relationship between the KQI vectors and the QOE values corresponding to the KQI vectors is confined within a preset value range.

10. A method for ensuring a current quality of experience (QOE) of a telecommunication service, comprising a network apparatus monitoring a plurality of network elements respectively providing the telecommunication service, wherein the network apparatus comprises at least a processor which is configured to cause the network apparatus to perform functions, comprising:

acquiring multiple groups of original Key Quality Indicator (KQI) vectors and a QOE value corresponding to each group of original KQI vectors in the multiple groups of original KQI vectors, wherein:

the multiple groups of original KQI vectors correspond to the plurality of network elements respectively providing the telecommunication service, each group of original KQI vectors comprises original KQI values corresponding to different KQI classes of the telecommunication service, the acquiring of the multiple groups of the original KQI vectors and the respective QOE value corresponding to each group of the original KQI vectors in the multiple groups of the original KQI vectors, further comprises:

acquiring the multiple original KQI values of a particular class of telecommunication service, wherein the multiple original KQI values constituting the multiple groups of the original KQI vectors;

standardizing each group of the original KQI vectors in the multiple groups of the original KQI vectors in order to form corresponding multiple groups of standardized KQI vectors, wherein each respective group of the standardized KQI vectors being corresponding to a Key Performance Index (KPI) state;

analyzing a relationship between original KQI values corresponding to a same KQI class in the multiple groups of original KQI vectors and QOE values corresponding to the original KQI vectors to establish a function relationship between the original KQI values corresponding to the same KQI class of the respective network elements which provide the telecommunication service, and the QOE values corresponding to the original KQI vectors;

according to a preset QOE threshold value, applying the function relationship to determine a KQI threshold value corresponding to a certain KQI class; and according to the KQI threshold value corresponding to the certain KQI class, adjusting a current KQI value corresponding to the certain KQI class to ensure that a current QOE value of the telecommunication service complies with the preset QOE threshold value, wherein the current QOE value is obtained from the acquired current KQI vector, by applying the function relationship between the original KQI vectors and the QOE values corresponding to the original KQI vectors; and utilizing the obtained current QOE value to adjust service parameters of the respective plurality of network elements to improve the telecommunication service, wherein the improving of the respective particular class of telecommunication service, comprises one or more of the following:
yielding higher caller connection success rate and better voice quality in voice service,
reducing caller access duration and call drop rate in voice service,
yielding higher access success rate, refresh success rate and average downloading speed in web browsing service,
reducing refresh duration and drop rate in web browsing service, and
yielding higher success rate and reducing delay in a short messaging service (SMS).

11. The method for ensuring the QOE of a telecommunication service according to claim 10, wherein,
the acquiring of the multiple groups of original KQI vectors and the QOE value corresponding to each group of original KQI vectors in the multiple groups of original KQI vectors specifically comprises:
acquiring original QOE values corresponding to the multiple groups of standardized KQI vectors;
selecting standardized KQI vectors whose KPI states are approximate to form sample standardized KQI vectors; and
stabilizing a relationship between original KQI values corresponding to a same KQI class in the sample standardized KQI vectors and original QOE values corresponding to the sample standardized KQI vectors to obtain stable original KQI values and stable QOE values;
accordingly, the analyzing the relationship between the original KQI values corresponding to the same KQI class in the multiple groups of original KQI vectors and the QOE values corresponding to the original KQI vectors to establish the function relationship between the original KQI values corresponding to the same KQI class and the QOE values corresponding to the original KQI vectors comprises:
analyzing a relationship between the stable original KQI values corresponding to the same KQI class and the stable QOE values corresponding to the stable original KQI values corresponding to the same KQI class to establish the function relationship.

12. The method for ensuring the QOE of a telecommunication service according to claim 11, wherein the acquiring of the original QOE values corresponding to the multiple groups of standardized KQI vectors specifically comprises:
selecting, from a vector space constituted by the standardized KQI vectors, a multi-dimensional space entity that comprises all the standardized KQI vectors, wherein each dimension of the multi-dimensional space entity comprises a minimum value, a maximum value, and a value between the minimum value and the maximum value that are in the standardized KQI vectors and fall on the dimension; evenly dividing the multi-dimensional space entity along each dimension of the multi-dimensional space entity into adjacent space area blocks, and selecting the same quantity of standardized KQI vectors from each of the space area blocks; and
acquiring original QOE values corresponding to the standardized KQI vectors selected from each of the space area blocks;
accordingly, the selecting the standardized KQI vectors whose KPI states are approximate to form the sample standardized KQI vectors comprises:
calculating distances between the standardized KQI vectors selected from each of the space area blocks; and
according to the calculated distances, selecting, for each of the selected standardized KQI vectors, multiple standardized KQI vectors that have shortest distances from the standardized KQI vector as the standardized KQI vectors whose KPI states are approximate to form the sample standardized KQI vectors.

13. The method for ensuring the QOE of a telecommunication service according to claim 10, wherein,
the acquiring of the multiple groups of the original KQI vectors and the QOE value corresponding to each group of the original KQI vectors in the multiple groups of original KQI vectors specifically comprises:
selecting standardized KQI vectors whose KPI states are evenly distributed to form sample standardized KQI vectors;
acquiring original QOE values corresponding to the sample standardized KQI vectors; and
stabilizing a relationship between original KQI values corresponding to a same KQI class in the sample standardized KQI vectors and original QOE values corresponding to the sample standardized KQI vectors to obtain stable original KQI values and stable QOE values;
accordingly, the analyzing the relationship between the KQI values corresponding to the same KQI class in the multiple groups of original KQI vectors and the QOE values corresponding to the original KQI vectors to establish the function relationship between the original KQI values corresponding to the same KQI class and the QOE values corresponding to the original KQI vectors specifically comprises:
analyzing a relationship between the stable original KQI values and the stable QOE values to establish the function relationship.

14. The method for ensuring the QOE of a telecommunication service according to claim 13, wherein,
the selecting the standardized KQI vectors whose KPI states are evenly distributed to form the sample standardized KQI vectors specifically comprises:
selecting, from a vector space constituted by the standardized KQI vectors, a multi-dimensional space entity that comprises all the standardized KQI vectors, wherein each dimension of the multi-dimensional space entity comprises a minimum value, a maximum value, and a value between the minimum value and the maximum value that are in the standardized KQI vectors and fall on the dimension; and
evenly dividing the multi-dimensional space entity along each dimension of the multi-dimensional space entity into adjacent space area blocks, selecting at random, from each of the space area blocks that comprises not less than the preset number N of standardized KQI vectors, N standardized KQI vectors, and using the selected N standardized KQI vectors as the standardized KQI vectors whose KPI states are evenly distributed to form the sample standardized KQI vectors.

15. The method for ensuring the QOE of a telecommunication service according to claim 11, wherein the stabilizing of the relationship between the original KQI values corresponding to the same KQI class in the sample standardized KQI vectors and the original QOE values corresponding to the sample standardized KQI vectors to obtain the stable original KQI values and stable QOE values specifically comprises:
sorting multiple original KQI values corresponding to multiple standardized KQI values corresponding to the same KQI class in the sample standardized KQI vectors to form an original KQI value sequence, and dividing the original KQI value sequence evenly into original KQI value sequence segments; and calculating an average value or probability distribution of original KQI values in each of the original KQI value sequence segments as a stable original KQI value, and calculating an average value or probability distribution of the respective QOE values corresponding to sample standardized KQI vectors where standard KQI values corresponding to the original KQI values in each of the original KQI value sequence segments are located as a stable QOE value.

16. The method for ensuring the QOE of a telecommunication service according to claim 11, wherein the stabilizing of the relationship between the original KQI values corresponding to the same KQI class in the sample standardized KQI vectors and the original QOE values corresponding to the sample standardized KQI vectors to obtain the stable original KQI values and stable QOE values specifically comprises:

using same QOE values corresponding to the sample standardized KQI vectors as the stable QOE values; and calculating an average value or probability distribution of original KQI values corresponding to multiple standardized KQI values corresponding to the same KQI class in the sample standardized KQI vectors that have the stable QOE values, as a stable original KQI value.

17. The method for ensuring the QOE of a telecommunication service according to claim 10 wherein the standardizing of each group of original KQI vectors in the multiple groups of original KQI vectors to form the corresponding multiple groups of standardized KQI vectors specifically comprises:

converting original KQI values in each of the original KQI vectors through formula (a) into standard scores to acquire a standardized KQI vector corresponding to the original KQI vector;

$$z = \frac{x - \bar{x}}{s} \quad (a)$$

wherein x is an original KQI value of an original KQI vector, is an average value of multiple original KQI values in the original KQI vector, and s is a standard deviation of the multiple original KQI vectors in the original KQI vector.

18. The method for ensuring the QOE value of a telecommunication service according to claim 11, wherein the analyzing of the relationship between the stable original KQI values and the stable QOE values to establish the function relationship specifically comprises: analyzing the relationship between the stable original KQI values and the stable QOE values and applying a single regression modeling method to establish the function relationship between the original KQI values corresponding to the same KQI class and the respective QOE values corresponding to the original KQI vectors.

19. The method for ensuring the QOE of a telecommunication service according to claim 18, wherein the applying of the single regression modeling method to establish the function relationship between the original KQI values corresponding to the same KQI class and the QOE values corresponding to the original KQI vectors specifically comprises: with the stable QOE values as independent variables, and with the stable original KQI values as dependent variables, obtaining the function relationship through regression analysis.

20. A method for ensuring quality of experience (QOE) of a telecommunication service, comprising a network apparatus monitoring a plurality of network elements respectively providing the telecommunication service, wherein the network apparatus comprises at least a processor which is configured to cause the network apparatus to perform functions, comprising:

acquiring multiple groups of original Key Quality Indicator (KQI) vectors and a QOE value corresponding to each group of original KQI vectors in the multiple groups of original KQI vectors, wherein the multiple groups of original KQI vectors correspond to the plurality of network elements respectively providing the telecommunication service, and each group of original KQI vectors comprises original KQI values corresponding to different KQI classes, wherein the acquiring the multiple groups of the original KQI vectors and the respective QOE value corresponding to each group of the original KQI vectors in the multiple groups of the original KQI vectors, further comprises:

acquiring the multiple original KQI values of a particular class of the telecommunication service, wherein the multiple original KQI values constituting the multiple groups of the original KQI vectors;

standardizing each group of original KQI vectors in the multiple groups of the original KQI vectors in order to form corresponding multiple groups of standardized KQI vectors, wherein each respective group of the standardized KQI vectors being corresponding to a corresponding Key Performance Index (KPI) state;

analyzing a relationship between original KQI values corresponding to a same KQI class in the multiple groups of original KQI vectors and QOE values corresponding to the original KQI vectors to establish a function relationship between the original KQI values corresponding to the same KQI class and the QOE values corresponding to the original KQI vectors;

acquiring a current KQI value under a certain KQI class, and applying the function relationship to determine a pre-estimated QOE value corresponding to the current KQI value of the telecommunication service;

comparing the pre-estimated QOE value corresponding to the current KQI value against a preset QOE threshold value to determine whether the pre-estimated QOE value corresponding to the current KQI value is less than the QOE threshold value;

if the pre-estimated QOE value corresponding to the current KQI value is less than the QOE threshold value, determining a theoretical KQI value corresponding to the pre-estimated QOE value corresponding to the current KQI value under each KQI class by applying the function relationship between the KQI values corresponding to the same KQI class and the QOE values corresponding to the KQI vectors and according to the pre-estimated QOE value corresponding to the current KQI value;

comparing the determined theoretical KQI value corresponding to the pre-estimated QOE value corresponding to the current KQI value under each KQI class and a preset KQI threshold value in the KQI class, and determining a KQI class under which the theoretical KQI value is most approximate to the preset KQI threshold value as a key KQI factor for resulting in a case where the pre-estimated QOE value is less than the preset QOE threshold value; and adjusting the determined key KQI factor to ensure that a current QOE value which corresponds to a respective network element which provides the respective telecommunication service complies with the preset QOE threshold value, wherein the current QOE value is obtained from the acquired current KQI vector, by applying the function relationship between the original KQI vectors and the QOE values corresponding to the original KQI vectors; and utilizing the obtained current QOE value to adjust service parameters of the respective network element to improve a respective particular class of telecommunication service, wherein the improving of the respective particular class of telecommunication service, comprises one or more of the following:

yielding higher caller connection success rate and better voice quality in voice service, reducing caller access duration and call drop rate in voice service, yielding higher access success rate, refresh success rate and average downloading speed in web browsing service, reducing refresh duration and drop rate in web browsing service, and yielding higher success rate and reducing delay in a short messaging service (SMS).

21. The method for ensuring QOE of a telecommunication service according to claim 20, wherein, the acquiring the multiple groups of original KQI vectors and the QOE value corresponding to each group of original KQI vectors in the multiple groups of original KQI vectors specifically comprises:

acquiring original QOE values corresponding to the multiple groups of standardized KQI vectors;

selecting standardized KQI vectors whose Key Performance Index (KPI) states are approximate to form sample standardized KQI vectors; and stabilizing a relationship between original KQI values corresponding to a same KQI class in the sample standardized KQI vectors and original QOE values corresponding to the sample standardized KQI vectors to obtain stable original KQI values and stable QOE values;

accordingly, the analyzing the relationship between the KQI values corresponding to the same KQI class in the multiple groups of original KQI vectors and the QOE values corresponding to the original KQI vectors to establish the function relationship between the original KQI values corresponding to the same KQI class and the QOE values corresponding to the original KQI vectors specifically comprises:

analyzing a relationship between the stable original KQI values and the stable QOE values to establish the function relationship.

22. The method for ensuring QOE of a telecommunication service according to claim 21, wherein the acquiring the original QOE values corresponding to the multiple groups of standardized KQI vectors specifically comprises:

selecting, from a vector space constituted by the standardized KQI vectors, a multi-dimensional space entity that comprises all the standardized KQI vectors, wherein each dimension of the multi-dimensional space entity comprises a minimum value, a maximum value, and a value between the minimum value and the maximum value that are in the standardized KQI vectors and fall on the dimension; evenly dividing the multi-dimensional space entity along each dimension of the multi-dimensional space entity into adjacent space area blocks, and selecting the same quantity of standardized KQI vectors from each of the space area blocks; and acquiring original QOE values corresponding to the standardized KQI vectors selected from each of the space area blocks;

accordingly, selecting the standardized KQI vectors whose KPI states are approximate to form sample standardized KQI vectors;

calculating distances between the standardized KQI vectors selected from each of the space area blocks; and according to the calculated distances, selecting, for each of the selected standardized KQI vectors, multiple standardized KQI vectors that have shortest distances from the standardized KQI vector as the standardized KQI vectors whose KPI states are approximate to form the sample standardized KQI vectors.

23. The method for ensuring QOE of a telecommunication service according to claim 20, wherein, the acquiring the multiple groups of original KQI vectors and the QOE value corresponding to each group of original KQI vectors in the multiple groups of original KQI vectors specifically comprises:

selecting standardized KQI vectors whose KPI states are evenly distributed to form sample standardized KQI vectors;

acquiring original QOE values corresponding to the sample standardized KQI vectors; and stabilizing a relationship between original KQI values corresponding to a same KQI class in the sample standardized KQI vectors and original QOE values corresponding to the sample standardized KQI vectors to obtain stable original KQI values and stable QOE values;

accordingly, the analyzing the relationship between the KQI values corresponding to the same KQI class in the multiple groups of original KQI vectors and the QOE values corresponding to the original KQI vectors to establish the function relationship between the original KQI values corresponding to the same KQI class and the QOE values corresponding to the original KQI vectors specifically comprises:

analyzing a relationship between the stable original KQI values and the stable QOE values to establish the function relationship.

24. The method for ensuring QOE of a telecommunication service according to claim 23, wherein, the selecting the standardized KQI vectors whose KPI states are evenly distributed to form the sample standardized KQI vectors specifically comprises:

selecting, from a vector space constituted by the standardized KQI vectors, a multi-dimensional space entity that comprises all the standardized KQI vectors, wherein each dimension of the multi-dimensional space entity comprises a minimum value, a maximum value, and a value between the minimum value and the maximum value that are in the standardized KQI vectors and fall on the dimension; and evenly dividing the multi-dimensional space entity along each dimension of the multi-dimensional space entity into adjacent space area blocks, selecting at random, from each of the space area blocks that comprises not less than the preset number N of standardized KQI vectors, N standardized KQI vectors, and using the selected N standardized KQI vectors as the standardized KQI vectors whose KPI states are evenly distributed to form the sample standardized KQI vectors.

25. The method for ensuring QOE of a telecommunication service according to any one of claim 21, wherein the stabilizing the relationship between the original KQI values corresponding to the same KQI class in the sample standardized KQI vectors and the original QOE values corresponding to the sample standardized KQI vectors to obtain the stable original KQI values and stable QOE values specifically comprises:

sorting multiple original KQI values corresponding to multiple standardized KQI values corresponding to the same KQI class in the sample standardized KQI vectors to form an original KQI value sequence, and dividing the original KQI value sequence evenly into original KQI value sequence segments; and calculating an average value or probability distribution of original KQI values in each of the original KQI value sequence segments as a stable original KQI value, and calculating an average value or probability distribution of QOE values corresponding to the sample standardized KQI vectors where standard KQI values corresponding to the original KQI values in each of the original KQI value sequence segments are located as a stable QOE value.

26. The method for ensuring QOE of a telecommunication service according to any one of claim 21, wherein the stabilizing the relationship between the original KQI values corresponding to the same KQI class in the sample standardized KQI vectors and the original QOE values corresponding to the sample standardized KQI vectors to obtain the stable original KQI values and stable QOE values specifically comprises:

using same QOE values corresponding to the sample standardized KQI vectors as the stable QOE values; and calculating an average value or probability distribution of original KQI values corresponding to multiple standardized KQI values corresponding to the same KQI class in the sample standardized KQI vectors that have the stable QOE values, as a stable original KQI value.

27. The method for ensuring QOE of a telecommunication service according to any one of claim 20, wherein the standardizing of each group of original KQI vectors in the multiple groups of original KQI vectors to form the corresponding multiple groups of standardized KQI vectors specifically comprises:

converting original KQI values in each of the original KQI vectors through formula (a) into standard scores to acquire a standardized KQI vector corresponding to the original KQI vector;

$$z = \frac{x - \bar{x}}{s} \quad (a)$$

wherein x is an original KQI value of an original KQI vector, $\bar{x}$ is an average value of multiple original KQI values in the original KQI vector, and s is a standard deviation of the multiple original KQI vectors in the original KQI vector.

28. The method for ensuring QOE of a telecommunication service according to any one of claim 21, wherein the analyzing the relationship between the stable original KQI values and the stable QOE values to establish the function relationship specifically comprises: analyzing the relationship between the stable original KQI values and the stable QOE values and applying a single regression modeling method to establish the function relationship between the original KQI values corresponding to the same KQI class and the QOE values corresponding to the original KQI vectors.

29. The method for ensuring QOE of a telecommunication service according to claim 28, wherein the applying the single regression modeling method to establish the function relationship between the original KQI values corresponding to the same KQI class and the QOE values corresponding to the original KQI vectors specifically comprises:

with a stable QOE value as an independent variable, and with a stable original KQI value as a dependent variable, obtaining the function relationship through regression analysis.

30. A network apparatus for acquiring a current quality of experience (QOE) value of a telecommunication service, comprising at least a processor which is configures the network apparatus to:

monitor a plurality of network elements respectively providing the telecommunication service;

acquire multiple groups of original Key Quality Indicator (KQI) vectors and a QOE value corresponding to each group of original KQI vectors in the multiple groups of original KQI vectors, wherein the multiple groups of original KQI vectors correspond to the plurality of network elements respectively providing the telecommunication service;

acquire multiple original KQI values of a particular class of the telecommunication service, wherein the multiple original KQI values constituting the multiple groups of original KQI vectors;

standardize each group of the original KQI vectors in the multiple groups of original KQI vectors in order to form corresponding multiple groups of standardized KQI vectors, wherein each respective group of standardized KQI vectors being corresponding to a corresponding Key Performance Index (KPI) state;

analyze a relationship between the multiple groups of original KQI vectors and QOE values corresponding to the multiple groups of original KQI vectors to establish a function relationship between the original KQI vectors which correspond to the plurality of network elements providing the telecommunication service, and respective QOE values corresponding to the KQI vectors; and acquire a current KQI vector, and apply the function relationship between the original KQI vectors and the respective QOE values corresponding to the KQI vectors, in order to obtain the current QOE value which corresponds to a respective network element which provides the respective telecommunication service corresponding to the current KQI vector; and utilize the obtained current QOE value to adjust service parameters of the respective network element to improve a respective particular class of telecommunication service, wherein the improving of the respective particular class of telecommunication service comprises the respective network element configured to perform one or more of the following:

yield higher caller connection success rate and better voice quality in voice service, reduce caller access duration and call drop rate in voice service, yield higher access success rate, refresh success rate and average downloading speed in web browsing service, reduce refresh duration and drop rate in web browsing service, and yield higher success rate and reducing delay in a short messaging service (SMS).

31. The network apparatus for acquiring the QOE value of a telecommunication service according to claim 30, wherein the network apparatus is further configure to:

acquire original QOE values corresponding to the multiple groups of standardized KQI vectors;

select standardized KQI vectors whose KPI states are approximate to form sample standardized KQI vectors; and stabilize a relationship between original KQI vectors corresponding to the sample standardized KQI vectors and original QOE values corresponding to the sample standardized KQI vectors to obtain stable original KQI vectors and stable QOE values;

accordingly, the analyzing of the relationship between the multiple groups of original KQI vectors and QOE values corresponding to the multiple groups of original KQI vectors establishes the function relationship between the KQI vectors and the QOE values corresponding to the KQI vectors comprises:

analyzing a relationship between the stable original KQI vectors and the stable QOE values to establish the function relationship.

32. The network apparatus for acquiring the QOE value of a telecommunication service according to claim 31, is further configured to:

select, from a vector space constituted by the standardized KQI vectors, a multi-dimensional space entity that comprises all the standardized KQI vectors, wherein each dimension of the multi-dimensional space entity comprises a minimum value, a maximum value, and a value between the minimum value and the maximum value that are in the standardized KQI vectors and fall on the dimension;

evenly divide the multi-dimensional space entity along each dimension of the multi-dimensional space entity into adjacent space area blocks, and select the same quantity of standardized KQI vectors from each of the space area blocks; and acquire original QOE values corresponding to the standardized KQI vectors selected from each of the space area blocks;

calculate distances between the standardized KQI vectors selected from each of the space area blocks; and according to the calculated distances, select, for each of the selected standardized KQI vectors, multiple standardized KQI vectors that have shortest distances from the standardized KQI vector as the standardized KQI vectors whose KPI states are approximate to form sample standardized KQI vectors.

33. The network apparatus for acquiring the QOE value of a telecommunication service according to claim 30, is further configured to:

select standardized KQI vectors whose KPI states are evenly distributed to form sample standardized KQI vectors; and acquire original QOE values corresponding to the sample standardized KQI vectors; and stabilize a relationship between original KQI vectors corresponding to the sample standardized KQI vectors and the original QOE values corresponding to the sample standardized KQI vectors to obtain stable original KQI vectors and stable QOE values;

analyze the relationship between the multiple groups of original KQI vectors and the QOE values corresponding to the multiple groups of original KQI vectors to establish the function relationship between the KQI vectors and the QOE values corresponding to the KQI vectors comprises:

analyze a relationship between the stable original KQI vectors and the stable QOE values to establish the function relationship.

34. The network apparatus for acquiring the QOE value of a telecommunication service according to claim 33, further configured to:

select, from a vector space constituted by the standardized KQI vectors, a multi-dimensional space entity that comprises all the standardized KQI vectors, wherein each dimension of the multi-dimensional space entity comprises a minimum value, a maximum value, and a value between the minimum value and the maximum value that are in the standardized KQI vectors and fall on the dimension; and evenly divide the multi-dimensional space entity along each dimension of the multi-dimensional space entity into adjacent space area blocks, select at random, from each of the space area blocks that comprises not less than the preset number N of standardized KQI vectors, N standardized KQI vectors, and use the selected N standardized KQI vectors as the standardized KQI vectors whose KPI states are evenly distributed to form sample standardized KQI vectors.

35. The network apparatus for acquiring the QOE value of a telecommunication service according to claim 31, wherein the stabilizing of the relationship between the original KQI vectors corresponding to the sample standardized KQI vectors and the original QOE values corresponding to the sample standardized KQI vectors to obtain the stable original KQI vectors and the stable QOE values, specifically comprises:

calculating an average value or probability distribution of the original KQI vectors corresponding to the sample standardized KQI vectors as a stable original KQI vector, and calculating an average value or probability distribution of the original QOE values corresponding to the sample standardized KQI vectors as a stable QOE value.

36. The network apparatus for acquiring the QOE value of a telecommunication service according to claim 30, wherein the standardizing of each group of the original KQI vectors in the multiple groups of original KQI vectors to form corresponding multiple groups of standardized KQI vectors, specifically comprises:

converting original KQI values in each of the original KQI vectors through formula (a) into standard scores to acquire a standardized KQI vector corresponding to the original KQI vector;

$$z = \frac{x - \bar{x}}{s} \qquad (a)$$

wherein x is an original KQI value of an original KQI vector, $\bar{x}$ is an average value of multiple original KQI values in the original KQI vector, and s is a standard deviation of the multiple original KQI vectors in the original KQI vector.

37. The network apparatus for acquiring the QOE value of a telecommunication service according to any one of claim 31, wherein the analyzing of the relationship between the multiple groups of original KQI vectors and the QOE values corresponding to the multiple groups of original KQI vectors to establish the function relationship between the KQI vectors and the QOE values corresponding to the KQI vectors, specifically comprises:

analyzing a relationship between the stable original KQI vectors and the stable QOE values and using a multiple regression modeling method to establish the function relationship between the KQI vectors and the QOE values corresponding to the KQI vectors.

38. The network apparatus for acquiring the QOE value of a telecommunication service according to claim 37, wherein the analyzing the relationship between the stable original KQI vectors and the stable QOE values and using the multiple regression modeling method to establish the function relationship between the KQI vectors and the QOE values corresponding to the KQI vectors specifically comprises:

with a stable original KQI vector as an independent variable, and with a stable QOE value as a dependent variable, obtaining the function relationship between the stable QOE values and the stable original KQI vectors through multiple regression analysis; and performing conversion for the obtained function relationship between the stable QOE values and the stable original KQI vectors to acquire the function relationship between the KQI vectors and the QOE values corresponding to the KQI vectors, so that a QOE value calculated through the acquired function relationship between the KQI vectors and the QOE values corresponding to the KQI vectors is confined within a preset value range.

39. A network apparatus for ensuring quality of experience (QOE) of a telecommunication service, comprising at least a processor which configures the network apparatus to:

monitor a plurality of network elements respectively providing the telecommunication service;

acquire multiple groups of original Key Quality Indicator (KQI) vectors and a QOE value corresponding to each group of original KQI vectors in the multiple groups of original KQI vectors, wherein the multiple groups of original KQI vectors correspond to the plurality of network elements respectively providing the telecommunication service, and each group of original KQI vectors comprises original KQI values corresponding to different KQI classes;

acquire multiple original KQI values of a particular class of the telecommunication service, wherein the multiple original KQI values constituting the multiple groups of original KQI vectors;

standardize each group of the original KQI vectors in the multiple groups of original KQI vectors in order to form corresponding multiple groups of standardized KQI vectors, wherein each respective group of standardized KQI vectors being corresponding to a corresponding Key Performance Index (KPI) state;

analyze a relationship between original KQI values corresponding to a same KQI class in the multiple groups of original KQI vectors and QOE values corresponding to the original KQI vectors to establish a function relationship between the original KQI values corresponding to the same KQI class and the QOE values corresponding to the original KQI vectors of the plurality of network elements which provide the telecommunication service;

according to a preset QOE threshold value, apply the function relationship to determine a KQI threshold value corresponding to a certain KQI class; and according to the KQI threshold value corresponding to the certain KQI class, adjust a current KQI value corresponding to the certain KQI class to ensure that a current QOE value of the telecommunication service complies with the preset QOE threshold value, wherein the current QOE value is obtained from the acquired current KQI vector, by applying the function relationship between the original KQI vectors and the QOE values corresponding to the original KQI vectors; and; and utilize the current QOE value to adjust service parameters of the respective network element to improve a respective particular class of telecommunication service, wherein the improving of the respective particular class of telecommunication service comprises the respective network element configured to perform one or more of the following:

yield higher caller connection success rate and better voice quality in voice service, reduce caller access duration and call drop rate in voice service, yield higher access success rate, refresh success rate and average downloading speed in web browsing service, reduce refresh duration and drop rate in web browsing service, and yield higher success rate and reducing delay in a short messaging service (SMS).

40. A network apparatus for ensuring quality of experience (QOE) of a telecommunication service, comprising at least a processor which configures the network apparatus to:

monitor a plurality of network elements respectively providing the telecommunication service;

acquire multiple groups of original Key Quality Indicator (KQI) vectors and a QOE value corresponding to each group of original KQI vectors in the multiple groups of original KQI vectors, wherein the multiple groups of original KQI vectors correspond to the plurality of network elements respectively providing the telecommunication service, and each group of original KQI vectors comprises original KQI values corresponding to different KQI classes;

acquire multiple original KQI values of a particular class of the telecommunication service, wherein the multiple original KQI values constituting the multiple groups of original KQI vectors;

standardize each group of the original KQI vectors in the multiple groups of original KQI vectors in order to form corresponding multiple groups of standardized KQI vectors, wherein each respective group of standardized KQI vectors being corresponding to a corresponding Key Performance Index (KPI) state;

analyze a relationship between original KQI values corresponding to a same KQI class in the multiple groups of original KQI vectors and QOE values corresponding to the original KQI vectors to establish a function relationship between the original KQI values corresponding to the same KQI class and the QOE values corresponding to the original KQI vectors;

acquire a current KQI value under a certain KQI class, and apply the function relationship to determine a pre-estimated QOE value corresponding to the current KQI value;

compare the pre-estimated QOE value corresponding to the current KQI value against a preset QOE threshold value to determine whether the pre-estimated QOE value corresponding to the current KQI value is less than the QOE threshold value;

if the pre-estimated QOE value corresponding to the current KQI value is less than the QOE threshold value, determine a theoretical KQI value corresponding to the pre-estimated QOE value corresponding to the current KQI value under each KQI class by applying the function relationship between the KQI values corresponding to the same KQI class and the QOE values corresponding to the KQI vectors and according to the pre-estimated QOE value corresponding to the current KQI value;

compare the determined theoretical KQI value corresponding to the pre-estimated QOE value corresponding to the current KQI value under each KQI class and a preset KQI threshold value in the KQI class, and determine a KQI class under which the theoretical KQI value is most approximate to the preset KQI threshold value as a key KQI factor for resulting in a case where the pre-estimated QOE value is less than the preset QOE threshold value; and adjust the determined key KQI factor to ensure that a current QOE value of the telecommunication service complies with the preset QOE threshold value, wherein the current QOE value is obtained from the acquired current KQI vector, by applying the function relationship between the original KQI vectors and the QOE values corresponding to the original KQI vectors; and utilize the current QOE value to adjust service parameters of respective network element to improve a respective particular class of telecommunication service, wherein the improving of the respective particular class of telecommunication service comprises the respective network element configured to perform one or more of the following:

yield higher caller connection success rate and better voice quality in voice service, reduce caller access duration and call drop rate in voice service, yield higher access success rate, refresh success rate and average downloading speed in web browsing service, reduce refresh duration and drop rate in web browsing service, and yield higher success rate and reducing delay in a short messaging service (SMS).

* * * * *